US008818687B2

(12) United States Patent  (10) Patent No.: US 8,818,687 B2
Nakasaka  (45) Date of Patent:  Aug. 26, 2014

(54) CONTROL APPARATUS OF INTERNAL COMBUSTION ENGINE

(75) Inventor: Yukihiro Nakasaka, Shizuoka-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 499 days.

(21) Appl. No.: 13/142,149

(22) PCT Filed: Dec. 25, 2008

(86) PCT No.: PCT/JP2008/073943
§ 371 (c)(1),
(2), (4) Date: Sep. 2, 2011

(87) PCT Pub. No.: WO2010/073411
PCT Pub. Date: Jul. 1, 2010

(65) Prior Publication Data
US 2011/0307159 A1  Dec. 15, 2011

(51) Int. Cl.
*F02D 41/26* (2006.01)
*F01L 31/00* (2006.01)

(52) U.S. Cl.
USPC .................. 701/102; 123/90.15; 123/406.11

(58) Field of Classification Search
USPC ........ 123/48 C, 48 R, 78 C, 78 E, 78 R, 90.1, 123/90.15, 90.16, 90.23, 90.17, 145 A, 316, 123/406.11, 406.21, 406.29, 406.45; 701/102–105, 114, 115
See application file for complete search history.

(56) References Cited

U.S. PATENT DOCUMENTS

| | | | |
|---|---|---|---|
| 7,917,279 B2* | 3/2011 | Akihisa et al. | 701/103 |
| 2005/0005908 A1* | 1/2005 | Tanei et al. | 123/406.33 |
| 2005/0268886 A1* | 12/2005 | Etou et al. | 123/406.29 |
| 2006/0070605 A1* | 4/2006 | Akihisa et al. | 123/478 |
| 2007/0095313 A1* | 5/2007 | Kamiyama et al. | 123/90.16 |
| 2007/0255487 A1* | 11/2007 | Etou et al. | 701/105 |

(Continued)

FOREIGN PATENT DOCUMENTS

| | | |
|---|---|---|
| JP | 60 230522 | 11/1985 |
| JP | 2005 69130 | 3/2005 |

(Continued)

OTHER PUBLICATIONS

International Search Report issued Mar. 3, 2009 in PCT/JP08/73943 filed Dec. 25, 2008.

*Primary Examiner* — John Kwon
*Assistant Examiner* — Johnny H Hoang
(74) *Attorney, Agent, or Firm* — Oblon, Spivak, McClelland, Maier & Neustadt, L.L.P.

(57) ABSTRACT

A control pattern corresponding to a ultra high expansion cycle is executed, wherein an actual timing IVCa of an intake valve closing timing is controlled to agree with a steady adapted value IVCt, an actual value ϵma of a mechanical compression ratio is controlled to agree with a steady adapted value ϵmt, and an ignition timing SA is controlled to agree with a steady adapted timing SAt. There are four cases that might be generated, including a case in which the IVCa is shifted toward a retard angle side or toward an advance angle side from the IVCt due to a response delay of a variable intake valve timing apparatus, and a case in which ϵma is shifted to a greater side or to a smaller side from the ϵmt due to the response delay of a variable compression ratio mechanism.

14 Claims, 20 Drawing Sheets

(56) References Cited

U.S. PATENT DOCUMENTS

| | | | |
|---|---|---|---|
| 2008/0283025 A1* | 11/2008 | Sato | 123/406.45 |
| 2008/0306676 A1* | 12/2008 | Akihisa et al. | 701/104 |
| 2009/0064966 A1* | 3/2009 | Nakasaka | 123/339.11 |
| 2009/0126668 A1* | 5/2009 | Shiraishi et al. | 123/145 A |
| 2009/0187329 A1* | 7/2009 | Akihisa et al. | 701/105 |
| 2009/0266338 A1* | 10/2009 | Kamiyama et al. | 123/48 C |
| 2011/0253108 A1* | 10/2011 | Kawasaki | 123/48 R |

FOREIGN PATENT DOCUMENTS

| | | |
|---|---|---|
| JP | 2006-046193 | 2/2006 |
| JP | 2007-177792 | 7/2007 |
| JP | 2007-303423 | 11/2007 |
| JP | 2008 25540 | 2/2008 |
| JP | 2008 223567 | 9/2008 |

\* cited by examiner

CONTROL APPARATUS OF INTERNAL COMBUSTION ENGINE

TECHNICAL FIELD

The present invention relates to a control apparatus of an internal combustion engine including a valve closing timing adjusting mechanism for adjusting a closing timing of an intake valve of the internal combustion engine; a mechanical compression ratio adjusting mechanism for adjusting a mechanical compression ratio of the internal combustion engine; and an ignition mechanism for igniting an air-fuel mixture in a combustion chamber of the internal combustion engine. Hereinafter, "a value obtained by dividing a volume of a combustion chamber at an intake bottom dead center by a volume in the combustion chamber at an intake top dead center" is defined as a "mechanical compression ratio", "a value obtained by dividing a volume in the combustion chamber at the closing timing of the intake valve by the volume in the combustion chamber at the intake top dead center" is defined as "actual compression ratio", and "a value obtained by dividing the volume in the combustion chamber at the opening timing of an exhaust valve by the volume in the combustion chamber at an expansion top dead center" is defined as an "expansion ratio". The actual compression ratio is calculated based upon the mechanical compression ratio and the intake valve closing timing.

BACKGROUND ART

Conventionally, a control pattern has been known in which, in a spark ignition internal combustion engine, a mechanical compression ratio is set to be an extremely great value (e.g., 20 or more), and a closing timing of an intake valve is considerably retarded from the intake bottom dead center (e.g., is retarded by 100° CA from the intake bottom dead center), in order to control the expansion ratio to be an extremely great value (e.g., 20 or more), while keeping the actual compression ration to be an appropriate range (e.g., 8 to 9) (e.g., see Japanese Unexamined Patent Application No. 2007-303423).

This control pattern is called Atkinson cycle. As the mechanical compression ration increases, the expansion ratio increases. As the expansion ratio increases, the period when a pushing-down force is applied to a piston during an expansion stroke increases, so that a thermal efficiency is enhanced. Accordingly, in the Atkinson cycle, the thermal efficiency (accordingly, fuel efficiency) of the internal combustion engine can be enhanced, while securing an appropriate combustion (specifically, without causing a knocking caused by an excessive actual compression ratio or misfire caused by very small actual compression ratio).

DISCLOSURE OF INVENTION

In the Atkinson cycle, the mechanical compression ratio and the intake valve closing timing are generally fixed, and an adjustment of a quantity of intake air (hereinafter referred to as a "cylinder intake air quantity") into a combustion chamber at the intake valve closing timing is attained solely by adjusting a degree of an opening of a throttle valve. On the other hand, the cylinder intake air quantity can also be adjusted by adjusting the intake valve closing timing. In general, the cylinder intake air quantity decreases, as the intake valve closing timing is shifted to a retard angle side from the intake bottom dead center. It is to be noted that, when the intake valve closing timing is adjusted with the mechanical compression ratio being fixed, the actual compression ratio is also changed. Accordingly, the mechanical compression ratio has to also be adjusted in order to keep the actual compression ratio substantially constant with the intake valve closing timing being adjusted. Specifically, when the intake valve closing timing is retarded (advanced), the mechanical compression ratio has to be increased (decreased).

In a field of an internal combustion engine, an environment has been created in recent years in which a valve closing timing adjusting mechanism for adjusting the closing timing of the intake valve and the mechanical compression ratio adjusting mechanism for adjusting the mechanical compression ratio of the internal combustion engine, those of which have high control precision, can be fabricated relatively easily with low cost.

In view of this, a control pattern has been proposed in which, in the Atkinson cycle, the intake valve closing timing and the mechanical compression ratio are both adjusted according to the operation state (required load, or the like) of the internal combustion engine, with the degree of the opening of the throttle valve being maintained to be the maximum state, by using the valve closing timing adjusting mechanism and the mechanical compression ratio adjusting mechanism, in order to adjust the cylinder intake air quantity (accordingly, the output torque of the internal combustion engine) with the actual compression ratio being kept substantially constant.

This control pattern is referred to as a ultra high expansion cycle. In the ultra high expansion cycle, the amount of a retard angle at the intake valve closing timing is particularly adjusted to be great, and the mechanical compression ratio is particularly adjusted to be great, in a low-load operation state (i.e., in the state in which the cylinder intake air quantity is small). Specifically, the expansion ratio can be adjusted to be particularly great. Accordingly, the thermal efficiency of the internal combustion engine in the low-load operation state can dramatically be enhanced.

In the ultra high expansion cycle, the intake valve closing timing and the mechanical compression ratio are generally adjusted so as to agree with an optimum combination (hereinafter referred to as "reference timing of the intake valve closing timing" and "reference value of the mechanical compression ratio") according to the operation state of the internal combustion engine (an accelerator opening degree, an engine revolution, or the like adjusted by a driver). The relationship between the reference timing of the intake valve closing timing and the reference value of the mechanical compression ratio, and the operation state of the internal combustion engine is determined beforehand by an experiment.

When the actual timing of the intake valve closing timing agrees with the reference timing of the intake valve closing timing, and the actual value of the mechanical compression ratio agrees with the reference value of the mechanical compression ratio because the valve closing timing adjusting mechanism and the mechanical compression ratio adjusting mechanism are appropriately operated, the actual value (that is calculated from the actual timing of the intake valve closing timing and the actual value of the mechanical compression ratio) of the actual compression ratio agrees with the reference value (that is calculated from the reference timing of the intake valve closing timing and the reference value of the mechanical compression ratio) of the actual compression ratio.

In a transient operation state, the actual timing of the intake valve closing timing might be shifted from the reference timing of the intake valve closing timing, or the actual value of the mechanical compression ratio might be shifted from the reference value of the mechanical compression ratio, due to the response delay in the valve closing timing adjusting mechanism and the mechanical compression ratio adjusting mechanism. In this case, the actual value of the actual compression ratio is shifted from the reference value of the actual compression ratio. When the actual value of the actual compression ratio is shifted toward a greater side, a knocking is liable to occur, and when the actual value of the actual compression ratio is shifted toward a smaller side, the combustion state is liable to be deteriorated (including the occurrence of misfire).

It is considered below that, when the actual value of the actual compression ratio is shifted from the reference value of the actual compression ratio because one of the intake valve closing timing and the mechanical compression ratio is shifted from the reference value, the other one of the intake valve closing timing and the mechanical compression ratio is controlled to be a condition different from the corresponding reference condition in order to return the actual value of the actual compression ratio to the reference value of the actual compression ratio. To control the actual timing of the intake valve closing timing to set to be a retard angle side (advance angle side) from the reference timing of the intake valve closing timing is referred to as "intake valve closing timing retard correction (intake valve closing timing advance correction", or merely referred to as "intake valve closing timing correction", while to control the actual value of the mechanical compression ratio to be a value greater (smaller) than the reference value of the mechanical compression ratio is referred to as "mechanical compression ratio increase correction (mechanical compression ratio decrease correction)", or merely referred to as "mechanical compression ratio correction". Specifically, when the actual value of the mechanical compression ratio is shifted to be greater (smaller) than the reference value of the mechanical compression ratio, for example, the intake valve closing timing retard correction (intake valve closing timing advance correction) is executed. When the actual timing of the intake valve closing timing is shifted to the retard angle side (advance angle side) from the reference timing of the intake valve closing timing, the mechanical compression ratio increase correction (the mechanical compression ratio decrease correction) is executed.

When the intake valve closing timing retard correction is executed, for example, a problem might arise as described above in which the cylinder intake air quantity is directly reduced, and the output torque of the internal combustion engine is reduced. On the other hand, when the intake valve closing timing advance correction is executed, a control of decreasing the degree of the opening of the throttle valve from the maximum state (this control is referred to as "throttle valve opening-degree decrease correction" below) has to be executed in order to prevent the increase in the cylinder intake air quantity. When the throttle valve opening-degree decrease correction is executed, the intake resistance in the intake path increases (a so-called pumping loss increases), so that a fuel efficiency might be deteriorated. When the mechanical compression ratio decrease correction is executed, the expansion ratio is directly reduced, which entails a problem of deterioration in the fuel efficiency.

From the above, it is not preferable from the viewpoint of securing the output torque and suppressing the deterioration in the fuel efficiency that the intake valve closing timing correction or the mechanical compression ratio correction is immediately executed in order to return the actual value of the actual compression ratio to the reference value of the actual compression ratio, when the actual value of the actual compression ratio is shifted from the reference value of the actual compression ratio.

The present invention is accomplished in view of the above-mentioned problems. An object of the present invention is to provide a control apparatus of an internal combustion engine that employs a control pattern in which a cylinder intake air quantity (accordingly, an output torque of an internal combustion engine) is adjusted with an actual value of an actual compression ratio being agreed with a reference value of the actual compression ratio by adjusting both an intake valve closing timing and a mechanical compression ratio according to an operation state of the internal combustion engine, wherein, when the actual value of the actual compression ratio is shifted from the reference value of the actual compression ratio, the occurrence of a knocking and deterioration of a combustion state, which are caused by the shift of the actual value of the actual compression ratio from the reference value of the actual compression ratio, can be suppressed, while securing an output torque and suppressing the deterioration in a fuel efficiency.

The control apparatus according to the present invention is applied to an internal combustion engine including the valve closing timing adjusting mechanism, the mechanical compression ratio adjusting mechanism, and the ignition mechanism for igniting an air-fuel mixture in a combustion chamber of the internal combustion engine as described above. The control apparatus according to the present invention includes a reference state determining unit, and a control unit.

The reference state determining unit determines the reference timing of the intake valve closing timing, the reference value of the mechanical compression ratio, and the reference timing of the ignition timing, according to the operation state of the internal combustion engine. When the ultra high expansion cycle is employed (i.e., when the intake valve closing timing is set to a ultra retard angle side from the intake bottom dead center), the reference timing of the intake valve closing timing is determined to be within a region where the timing is retarded toward the retard angle side from the intake bottom dead center by 90° CA or more. When the intake valve closing timing is set to a ultra advance angle side from the intake bottom dead center, the reference timing of the intake valve closing timing is determined to be within a region where the timing is advanced toward the advance angle side from the intake bottom dead center by 90° CA or more. The reference value of the mechanical compression ratio is set to be within the region of 20 or more, for example. The reference timing of the ignition timing is determined to be within a region around a region immediately before the intake top dead center, for example.

The control unit controls the valve closing timing adjusting mechanism so as to allow the actual timing of the closing timing of the intake valve to agree with the reference timing of the closing timing in principle (e.g., makes a feedback control). The control unit also controls the mechanical compression ratio adjusting mechanism so as to allow the actual value of the mechanical compression ratio to agree with the reference value of the mechanical compression ratio in principle (e.g., makes a feedback control). By virtue of these controls, it is controlled such that the actual value of the actual compression ratio agrees with the reference value of the actual compression ratio. The actual value of the actual compression ratio can be calculated from the actual timing of the intake valve closing timing and the actual value of the mechanical compression ratio, while the reference value of the actual compression ratio can be calculated from the reference timing of the intake valve closing timing and the reference value of the mechanical compression ratio. The reference value of the actual compression ratio is determined to be within a region of about 8 to 9 (so as to be substantially constant) in order to prevent the occurrence of the knocking and deterioration in the combustion state.

The control unit also controls the ignition mechanism so as to allow the ignition timing to agree with the reference timing of the ignition timing in principle. The control unit also controls the throttle valve adjusting mechanism so as to allow the degree of the opening of the throttle valve to be the maximum value in principle.

The feature of the control apparatus according to the present invention is such that the control unit is configured as described below. Specifically, when the actual value of the actual compression ratio is shifted from the reference value of the actual compression ratio, and the actual value of the actual compression ratio falls within a range between a predetermined lower limit value and a predetermined upper limit value (within a predetermined range including the reference value of the actual compression ratio), the control unit is configured to control the ignition timing to be a timing different from the reference timing of the ignition timing, not to be the reference timing of the ignition timing.

When the actual value of the actual compression ratio is shifted to be greater than the reference value, the knocking is liable to occur as described above. The occurrence of the knocking can be suppressed through the control in which the ignition timing is shifted to the retard angle side from the reference timing of the ignition timing, so long as the actual value of the actual compression ratio is not so excessively shifted to be greater than the reference value. When the actual value of the actual compression ratio is shifted to be smaller than the reference value, the combustion state is liable to deteriorate (including the occurrence of misfire). The deterioration in the combustion state (including the occurrence of misfire) can be prevented through the control in which the ignition timing is shifted to the advance angle side from the reference timing of the ignition timing, so long as the actual value of the actual compression ratio is not so excessively shifted to be smaller than the reference value. To control the ignition timing to be shifted toward the retard angle side (advance angle side) from the reference timing of the ignition timing is referred to as "ignition timing retard correction (ignition timing advance correction)", or merely referred to as "ignition timing correction" below.

On the other hand, although described in detail later, so long as the actual value of the actual compression ratio is not so excessively shifted from the reference value, the execution of the ignition timing correction in which the state that the actual value of the actual compression ratio is shifted from the reference value of the actual compression ratio is maintained might sometimes be advantageous for securing the output torque and preventing the deterioration in the fuel efficiency, rather than the execution of the intake valve closing timing correction or the mechanical compression ratio correction so as to return the actual value of the actual compression ratio to the reference value of the actual compression ratio, in order to prevent the occurrence of the knocking and the deterioration in the combustion state, which are caused by the shift of the actual value of the actual compression ratio from the reference value of the actual compression ratio.

The feature of the control apparatus according to the present invention is based upon the knowledge described above. Specifically, when the actual value of the actual compression ratio is shifted to be greater than the reference value of the actual compression ratio, and the actual value of the actual compression ratio falls within a range between a predetermined lower limit value and a predetermined upper limit value, the ignition timing retard correction is executed. On the other hand, when the actual value of the actual compression ratio is shifted to be smaller than the reference value of the actual compression ratio, and the actual value of the actual compression ratio falls within the range between the predetermined lower limit value and the predetermined upper limit value, the ignition timing advance correction is executed.

The predetermined upper limit value is set to be an upper limit within a range of the actual compression ratio by which the occurrence of the knocking can be prevented by the ignition timing retard correction, while the predetermined lower limit value is set to be a lower limit within a range of the actual compression ratio by which the deterioration in the combustion state (including the occurrence of misfire) can be prevented by the ignition timing advance correction.

Since the upper limit value and the lower limit value are affected by the actual value of the mechanical compression ratio, for example, they can be determined based upon the actual value of the mechanical compression ratio.

As the shift amount of the actual value of the actual compression ratio to the greater side from the reference value of the actual compression ratio is great, the correction amount of the ignition timing retard correction can be set to be greater. Similarly, as the shift amount of the actual value of the actual compression ratio to the smaller side from the reference value of the actual compression ratio is great, the correction amount of the ignition timing advance correction can be set to be greater.

When the intake valve closing timing is at the retard angle side (advance angle side) from the bottom dead center, the case where the actual value of the actual compression ratio is shifted toward the greater side from the reference value of the actual compression ratio includes a case in which the actual value of the mechanical compression ratio is shifted to the greater side from the reference value of the mechanical compression ratio, and a case in which the intake valve closing timing is shifted to the advance angle side (retard angle side) from the reference timing of the intake valve closing timing. On the other hand, the case where the actual value of the actual compression ratio is shifted to the smaller side from the reference value of the actual compression ratio includes a case in which the actual value of the mechanical compression ratio is shifted toward the smaller side from the reference value of the mechanical compression ratio, and a case in which the intake valve closing timing is shifted to the retard angle side (advance angle side) from the reference timing of the intake valve closing timing. Specifically, there are four factors as a factor of the shift of the actual value of the actual compression ratio from the reference value of the actual compression ratio. For the sake of convenience of description, the case in which the intake valve closing timing is at the retard angle side from the bottom dead center will only be described below.

Described below is the case in which "to secure an output torque required by a driver takes first priority, and a pattern having the best fuel efficiency is selected in this case" when the actual value of the actual compression ratio is shifted from the reference value of the actual compression ratio. As for the intake valve closing timing, "the side close to the top dead center (bottom dead center)" means the "retard angle side (advance angle side)" when the intake valve closing timing is at the retard angle side from the bottom dead center, while means the "advance angle side (retard angle side)" when the intake valve closing timing is at the advance angle side from the bottom dead center Firstly, the case in which the actual value of the mechanical compression ratio is shifted to the greater side from the reference value of the mechanical compression ratio will be described. In this case, the actual value of the actual compression value becomes greater than the reference value of the actual compression ratio, so that the intake valve closing timing retard correction or the ignition timing retard correction can be selected in order to prevent the occurrence of the knocking. When the intake valve closing timing retard correction is executed, the cylinder intake air quantity directly decreases, resulting in that the output torque of the internal combustion engine is liable to reduce, as described above. On the other hand, even when the ignition timing retard correction is executed, the output torque is difficult to reduce. From the above, in this case, the ignition timing retard correction is selected and executed, so long as the actual value of the actual compression ratio is not more than the predetermined upper limit value. On the other hand, when the actual value of the actual compression ratio is greater than the predetermined upper limit value, the occurrence of the knocking cannot be prevented only by the ignition timing retard correction. Accordingly, the intake valve closing timing retard correction is executed, in addition to the ignition timing retard correction, in order to allow the actual value of the actual compression ratio to be not more than the predetermined upper limit value. Alternatively, only the intake valve closing timing retard correction is executed.

The case in which the actual timing of the intake valve closing timing is shifted to the advance angle side from the reference timing of the intake valve closing timing will next be described. In this case, the actual value of the actual compression value becomes greater than the reference value of the actual compression ratio, so that the mechanical compression ratio decrease correction or the ignition timing retard correction can be selected in order to prevent the occurrence of the knocking. Even when either one of the mechanical compression ratio decrease correction and the ignition timing retard correction is executed, the output torque is not so different. On the other hand, when the mechanical compression ratio decrease correction is executed, the expansion ratio is directly reduced, so that the fuel efficiency is liable to deteriorate, as described above. On the other hand, even when the ignition timing retard correction is executed, the fuel efficiency is difficult to deteriorate. From the above, in this case, the ignition timing retard correction is selected and executed, so long as the actual value of the actual compression ratio is not more than the predetermined upper limit value. On the other hand, when the actual value of the actual compression ratio is greater than the predetermined upper limit value, the occurrence of the knocking cannot be prevented only by the ignition timing retard correction. Accordingly, the mechanical compression ratio decrease correction is executed, in addition to the ignition timing retard correction, in order to allow the actual value of the actual compression ratio to be not more than the predetermined upper limit value. Alternatively, only the mechanical compression ratio decrease correction is executed.

The case in which the actual timing of the mechanical compression ratio is shifted to the smaller side from the reference value of the mechanical compression ratio will next be described. In this case, the actual value of the actual compression value becomes smaller than the reference value of the actual compression ratio, so that the intake valve closing timing advance correction or the ignition timing advance correction can be selected in order to prevent the deterioration in the combustion state (including the occurrence of misfire). Even when either one of the intake valve closing timing advance correction and the ignition timing advance correction is executed, the output torque is not so different. On the other hand, when the intake valve closing timing advance correction is executed, the throttle valve opening-degree decrease correction is simultaneously executed. When the throttle valve opening-degree decrease correction is executed, the intake resistance in the intake path increases, so that the fuel efficiency is liable to deteriorate. On the other hand, even when the ignition timing advance correction is executed, the fuel efficiency is difficult to deteriorate. From the above, in this case, the ignition timing advance correction is selected and executed, so long as the actual value of the actual compression ratio is not less than the predetermined lower limit value. On the other hand, when the actual value of the actual compression ratio is less than the predetermined lower limit value, the deterioration of the combustion state (including the occurrence of misfire) cannot be prevented only by the ignition timing advance correction. Accordingly, the intake valve closing timing advance correction is executed, in addition to the ignition timing advance correction (and the throttle valve opening-degree decrease correction), in order to allow the actual value of the actual compression ratio to be not less than the predetermined lower limit value. Alternatively, only the intake valve closing timing advance correction (and the throttle valve opening-degree decrease correction) is executed.

The case in which the actual timing of the intake valve closing timing is shifted to the retard angle side from the reference timing of the intake valve closing timing will finally be described. In this case, the actual value of the actual compression value becomes smaller than the reference value of the actual compression ratio, so that the mechanical compression ratio increase correction or the ignition timing advance correction can be selected in order to prevent the deterioration of the combustion state (including the occurrence of misfire). In this case, the output torque is reduced by the decrease in the cylinder intake air quantity, because the intake valve closing timing is shifted to the retard angle side. Even when the ignition timing advance correction is executed, the output torque is difficult to increase (is difficult to restore). On the other hand, when the mechanical compression ratio increase correction is executed, the expansion ratio is directly increased, so that the thermal efficiency is enhanced, with the result that the output torque is easy to increase (is easy to restore). From the above, in this case, the mechanical compression ratio increase correction is only executed in order to allow the actual value of the actual compression ratio to agree with the reference value of the actual compression ratio, regardless of whether the actual value of the actual compression ratio is not less than the predetermined lower limit value or not. The case in which "to secure an output torque required by a driver takes first priority, and a pattern having the best fuel efficiency is selected in this case" has been described above.

Described below is the case in which "a pattern where the suppression of the deterioration in fuel efficiency takes first priority is selected", when an output compensating unit (output torque compensating unit) is provided that compensates the reduction in the output torque (output) caused by the shift of the actual timing of the intake valve closing timing toward the side close to the top dead center from the reference timing of the closing timing (caused by the reduction in the cylinder intake air quantity), and the actual value of the actual compression value is shifted from the reference value of the actual compression ratio.

Examples of the output compensating unit include a unit that compensates a reduction in the output torque (output) of the internal combustion engine by increasing the output torque of a motor mounted to a vehicle, having the internal combustion engine mounted thereto, and a unit that compensates the reduction in the output torque of the internal combustion engine by increasing the output torque itself of the internal combustion engine through the increase of a speed reducing ratio of a transmission (particularly, a continuously variable transmission) mounted to a vehicle having the internal combustion engine mounted thereto and the increase in the operation speed of the internal combustion engine. The control for operating the output torque compensating unit is also referred to as "torque increase correction" below.

The case in which the actual value of the mechanical compression ratio is shifted to the greater side from the reference value of the mechanical compression ratio will firstly be described. In this case, the intake valve closing timing retard correction or the ignition timing retard correction can be selected as described above. In this case, since the expansion ratio is great because the mechanical compression ratio is shifted to the greater side, the fuel efficiency is in a good state. When the ignition timing retard correction is executed, the fuel efficiency tends to deteriorate. On the other hand, even when the intake valve closing timing retard correction is executed, the fuel efficiency can be maintained. From the above, in this case, the intake valve closing timing retard correction is executed in order to allow the actual value of the actual compression ratio to agree with the reference value of the actual compression ratio, regardless of whether the actual value of the actual compression ratio is not more than the predetermined upper limit value or not. When the intake valve closing timing retard correction is executed, the output torque of the internal combustion engine is liable to reduce. In order to compensate the reduction in the output torque of the internal combustion engine, the torque increase correction is simultaneously executed in addition to the intake valve closing timing retard correction.

The case in which the actual timing of the intake valve closing timing is shifted to the advance angle side from the reference timing of the intake valve closing timing will next be described. In this case, the mechanical compression ratio decrease correction or the ignition timing retard correction can be selected as described above. As described above, when the mechanical compression ratio decrease correction is executed, the fuel efficiency is liable to deteriorate, while the fuel efficiency is difficult to deteriorate even when the ignition timing retard correction is executed. From the above, the correction same as that in the case in which "to secure an output torque required by a driver takes first priority, and a pattern having the best fuel efficiency is selected in this case" is executed. In this case, the output torque of the internal combustion engine is difficult to reduce even when either one of the mechanical compression ratio decrease correction and the ignition timing retard correction is executed. Accordingly, the torque increase correction is not executed.

The case in which the actual timing of the mechanical compression ratio is shifted to the smaller side from the reference value of the mechanical compression ratio will next be described. In this case, the intake valve closing timing advance correction or the ignition timing advance correction can be selected as described above. When the intake valve closing timing advance correction is executed, the throttle valve opening-degree decrease correction is simultaneously executed as described above, whereby the fuel efficiency is liable to deteriorate. On the other hand, even when the ignition timing advance correction is executed, the fuel efficiency is difficult to deteriorate. From the above, in this case, the correction same as that in the case in which "to secure an output torque required by a driver takes first priority, and a pattern having the best fuel efficiency is selected in this case" is executed. In this case, the output torque of the internal combustion engine is difficult to reduce even when either one of the intake valve closing timing advance correction and the ignition timing advance correction is executed. Accordingly, the torque increase correction is not executed.

The case in which the actual timing of the intake valve closing timing is shifted to the retard angle side from the reference timing of the intake valve closing timing will finally be described. In this case, the mechanical compression ratio increase correction or the ignition timing advance correction can be selected as described above. In this case, even when the ignition timing advance correction is executed, the fuel efficiency is difficult to improve. On the other hand, when the mechanical compression ratio increase correction is executed, the expansion ratio is directly increased, so that the thermal efficiency is enhanced, with the result that the fuel efficiency is easy to improve. From the above, in this case, the correction same as that in the case in which "to secure an output torque required by a driver takes first priority, and a pattern having the best fuel efficiency is selected in this case" is executed. In this case, the output torque is reduced due to the reduction in the cylinder intake air quantity, which is caused by the shift of the intake valve closing timing to the retard angle side. In order to compensate the reduction in the output torque of the internal combustion engine, the torque increase correction is simultaneously executed with the mechanical compression ratio increase correction. The case in which "a pattern where the suppression of the deterioration in fuel efficiency takes first priority is selected" has been described above.

Two control apparatuses according to the present invention described below can be extracted from the control apparatus according to the present invention. Firstly, the control apparatus includes the reference state determining unit and the control unit same as those described above, wherein the control unit executes the mechanical compression ratio increase correction when the actual timing of the intake valve closing timing is shifted to the side close to the top dead center from the reference timing of the closing timing. With this structure, the "reduction in the output torque due to the reduction in the cylinder intake air quantity, which is caused by the shift of the intake valve closing timing toward the retard angle side" can be compensated by "the enhancement in the thermal efficiency due to the increase in the expansion ratio accompanied by the increase in the mechanical compression ratio".

Secondly, the control apparatus includes the reference state determining unit and the control unit same as those described above, wherein the control unit executes the intake valve closing timing retard correction and the torque increase correction, when the actual value of the mechanical compression ratio is greater than the reference value of the mechanical compression ratio. With this structure, the reduction in the output of the internal combustion engine caused by the intake valve closing timing retard correction can be compensated by the torque increase correction, while keeping the fuel efficiency by the selection of the intake valve closing timing retard correction.

PREFERRED EMBODIMENT FOR CARRYING OUT THE INVENTION

A first embodiment of a control apparatus of an internal combustion engine according to the present invention will be described below with reference to the drawings.

First Embodiment (Configuration)

Figure 1:
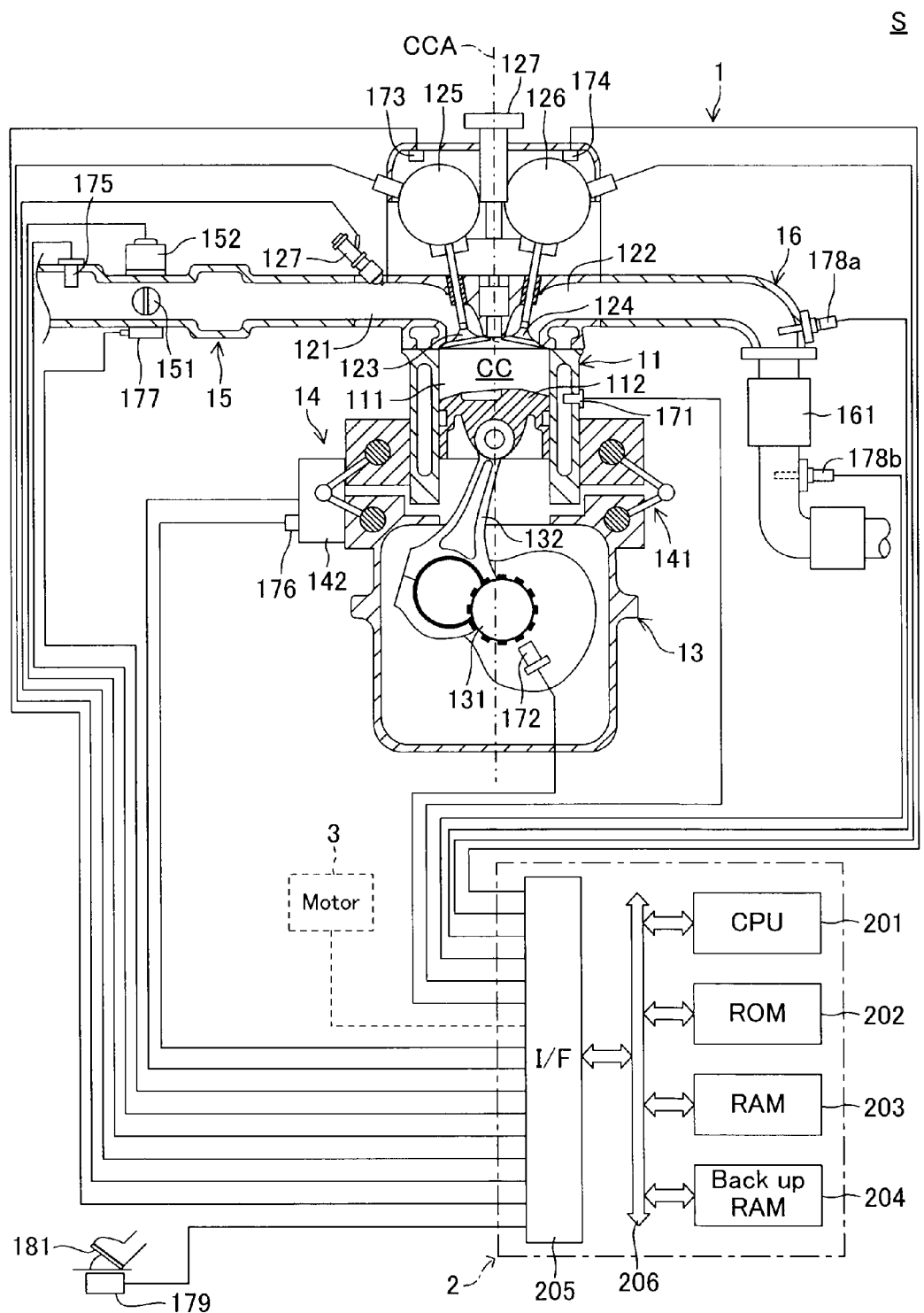
FIG. 1 is a schematic structural view of a system in which a control apparatus of an internal combustion engine according to a first embodiment of the present invention is applied to a spark ignition multi-cylinder internal combustion engine.

FIG. 1 is a schematic structural view illustrating an overall configuration of a system S (vehicle), which is a subject to which the present invention is to be applied, and which includes a spark ignition internal combustion engine 1 of an in-line multi-cylinder type and a control apparatus 2 according to the first embodiment of the present invention. FIG. 1 illustrates a cross-section of the internal combustion engine 1 taken along a plane orthogonal to the cylinder arranging direction.

The internal combustion engine 1 includes a cylinder block 11, a cylinder head 12, a crankcase 13, and a variable compression ratio mechanism 14. An intake path 15 and an exhaust path 16 are connected to the internal combustion engine 1.

A cylinder bore 111 that is a through-hole having substantially a columnar shape is formed on the cylinder block 11. As described above, plural cylinder bores 111 are formed on the cylinder block 11 on a line along the cylinder arranging direction. A piston 112 is accommodated in each cylinder bore 111 so as to be capable of reciprocating along a central axis (hereinafter referred to as "cylinder central axis CCA") of the cylinder bore 111. The cylinder head 12 is bonded to one end (upper end in the figure) of the cylinder block 11. The cylinder block 11 and the cylinder head 12 are fixed by an unillustrated bolt so as not to make a relative movement.

Plural recessed portions are formed at the end of the cylinder head 12 (at the lower end in the figure) at the side of the cylinder block 11 at the position corresponding to one end (upper end in the figure) of each cylinder bore 111. Specifically, a combustion chamber CC is formed by an inner space of the cylinder bore 111 at the side of the cylinder head 12 from the top surface of the piston 112 wherein the cylinder head 12 is bonded and fixed to the cylinder block 11, and the inner space of the recessed portion. An intake port 121 and an exhaust port 122 are formed to the cylinder head 12 so as to communicate with the combustion chamber CC.

The cylinder head 12 is provided with an intake valve 123, an exhaust valve 124, a variable intake valve timing apparatus 125, a variable exhaust valve timing apparatus 126, and an injector 127. The intake valve 123 is a valve for controlling the communication state between the intake port 121 and the combustion chamber CC. The exhaust valve 124 is a valve for controlling the communication state between the exhaust port 122 and the combustion chamber CC. The variable intake valve timing apparatus 125 and the variable exhaust valve timing apparatus 126 are configured to be capable of changing the opening and closing timing (and the maximum lift amount) of the intake valve 123 and the exhaust valve 124. The specific structure of the variable intake valve timing apparatus 125 and the variable exhaust valve timing apparatus 126 are well known, so that the description thereof will be skipped. The injector 127 is configured to be capable of injecting a fuel, which is to be supplied into the combustion chamber CC, into the intake port 121.

A crankshaft 131 is arranged in the crankcase 13 so as to be parallel to the cylinder arranging direction and so as to be rotatably supported. The crankshaft 131 is coupled to the piston 112 via a connection rod 132 so as to be rotated based upon the reciprocating movement of the piston 112 along the cylinder central axis CCA.

The variable compression ratio mechanism 14 in the internal combustion engine 1 according to the present embodiment is configured to relatively move the bonded body of the cylinder block 11 and the cylinder head 12 with respect to the crankcase 13 along the cylinder central axis CCA in order to change the volume (clearance volume) of the combustion chamber at the intake top dead center, thereby being capable of changing the mechanical compression ratio. The variable compression ratio mechanism 14 has a configuration same as those described in Japanese Unexamined Patent Applications No. 2003-206771 and 2008-19799. Therefore, the detailed description of this mechanism will be skipped in the specification of the present invention, and only an outline will be described.

The variable compression ratio mechanism 14 includes a coupling mechanism 141, and a drive mechanism 142. The coupling mechanism 141 is configured to couple the cylinder block 11 and the crankcase 13 so as to allow the cylinder block 11 and the crankcase 13 to relatively move along the cylinder central axis CCA. The drive mechanism 142 has a motor and a gear, and is configured to allow the cylinder block 11 and the crankcase 13 to relatively move along the cylinder central axis CCA.

An intake passage 15 including an intake manifold or a surge tank is connected to the intake port 121. An exhaust passage 16 including an exhaust manifold is connected to the exhaust port 122.

A throttle valve 151 is provided to the intake passage 15. The throttle valve 151 is driven to rotate by a throttle valve actuator 152 made of a DC motor.

The exhaust passage 16 is a passage of an exhaust gas exhausted from the combustion chamber CC through the exhaust port 122. A catalytic converter 161 is mounted to the exhaust passage 16. The catalytic converter 161 has a three-way catalyst having an oxygen storing function provided therein, and is configured to be capable of purifying HC, CO, and NOx in the exhaust gas.

The system S includes various sensors such as a cooling water temperature sensor 171, a crank position sensor 172, an intake cam position sensor 173, an exhaust cam position sensor 174, an air flowmeter 175, a relative position sensor 176, a throttle position sensor 177, an upstream air-fuel ratio sensor 178a, a downstream air-fuel ratio sensor 178b, and an accelerator opening-degree sensor 179.

The cooling water temperature sensor 171 is mounted to the cylinder block 11. The cooling water temperature sensor 171 is configured to output a signal corresponding to a temperature Tw of cooling water in the cylinder block 11.

The crank position sensor 172 is mounted to the crankcase 13. The crank position sensor 172 is configured to output a signal having a waveform with a pulse according to a rotation angle of the crankshaft 131. Specifically, the crank position sensor 172 is configured to output a signal corresponding to an engine revolution NE.

The intake cam position sensor 173 and the exhaust cam position sensor 174 are mounted to the cylinder head 12. The intake cam position sensor 173 is configured to output a signal of a waveform having a pulse according to a rotation angle of an unillustrated intake camshaft (included in the variable intake valve timing apparatus 125) for causing the intake valve 123 to make a reciprocating movement. Specifically, the intake cam position sensor 173 is configured to output a signal corresponding to an opening/closing timing (accordingly, the actual timing of the closing timing of the intake valve 123) of the intake valve 123.

The exhaust cam position sensor 174 is similarly configured to output a signal of a waveform having a pulse according to a rotation angle of an unillustrated exhaust camshaft. Specifically, the exhaust cam position sensor 174 is configured to output a signal corresponding to an opening/closing timing of the exhaust valve 124.

The air flowmeter 175 is mounted to the intake passage 15. The air flowmeter 175 is configured to output a signal corresponding to an intake air quantity Ga, which is a mass flow rate of an intake air flown in the intake passage 15.

The relative position sensor 176 is mounted to the variable compression ratio mechanism 14. The relative position sensor 176 is configured to output a signal corresponding to the relative position of the cylinder block 11 and the crankcase 13. Specifically, the relative position sensor 176 is configured to output a signal corresponding to an actual value of the mechanical compression ratio.

The throttle position sensor 177 is mounted to the intake passage 15. The throttle position sensor 177 is configured to output a signal corresponding to a rotation phase (a throttle valve opening degree TA) of the throttle valve 151.

The upstream air-fuel ratio sensor 178a and the downstream air-fuel ratio sensor 178b are mounted to the exhaust passage 16. The upstream air-fuel ratio sensor 178a is arranged at the upstream side from the catalytic converter 161 in the flowing direction of the exhaust gas. The downstream air-fuel ratio sensor 178b is arranged at the downstream side from the catalytic converter 161 in the flowing direction of the exhaust gas. The upstream air-fuel ratio sensor 178a is a critical current type oxygen concentration sensor, and it is configured to have a relatively linear output characteristic in a wide air-fuel ratio range. The downstream air-fuel ratio sensor 178b is a solid electrolyte zirconia oxygen sensor, and it is configured to have an output characteristic in which the output is almost constant at a rich side and a lean side from a stoichiometric air-fuel ratio, but is sharply changed before and after the stoichiometric air-fuel ratio.

The accelerator opening-degree sensor 179 is configured to output a signal corresponding to an operation amount (accelerator operation amount Accp) on an accelerator pedal 181 operated by a driver.

The control apparatus 2 in the present embodiment includes a CPU 201, a ROM 202, a RAM 203, a backup RAM 204, an interface 205, and a bus 206. The CPU 201, ROM 202, RAM 203, backup RAM 204, and the interface 205 are interconnected with the bus 206.

The ROM 202 stores beforehand a routine (program) executed by the CPU 201, and tables (lookup table, map) or parameters referred to during the execution of the routine. The RAM 203 is configured to be capable of temporarily storing data, according to need, when the CPU 201 executes the routine. The backup RAM 204 is configured to store data, when the CPU 201 executes the routine with the power source being turned on, and to be capable of holding the stored data even after the power source is turned off.

The interface 205 is electrically connected to the various sensors such as the cooling water temperature sensor 171, the crank position sensor 172, the intake cam position sensor 173, the exhaust cam position sensor 174, the air flowmeter 175, the relative position sensor 176, the throttle position sensor 177, the upstream air-fuel ratio sensor 178a, the downstream air-fuel ratio sensor 178b, and the accelerator opening-degree sensor 179, and is configured to be capable of transmitting the signals from these sensors to the CPU 201.

The interface 205 is also electrically connected to operation units such as the variable intake valve timing apparatus 125, the variable exhaust valve timing apparatus 126, the injector 127, and the drive mechanism 142, and is configured to be capable of transmitting operation signals for operating these operation units from the CPU 201 to these operation units.

Specifically, the control apparatus 2 is configured to receive signals from various sensors described above and transmit the above-mentioned operation signals to the respective operation units, via the interface 205, based upon the operation result of the CPU 201 according to the signals.

(Control of Throttle Valve Opening Degree)

As described later, the present embodiment employs a pattern corresponding to the above-mentioned ultra high expansion cycle as the control pattern of the intake valve closing timing and the mechanical compression ratio. With this, the throttle valve opening degree TA controlled by the control apparatus 2 is generally fixed to be the maximum state, and in a special case such as a case in which a later-described IVC advance correction is executed, or in a state under a very low load with a very low rotation, it is adjusted to be a value smaller than the maximum state.

(Fuel Injection Control)

In the present embodiment, the target air-fuel ratio is set to be the stoichiometric air-fuel ratio, except for a special case such as during a warm-up operation or during an acceleration. The control apparatus 2 calculates a basic fuel injection amount based upon the target air-fuel ratio, an intake air quantity Ga, and the engine revolution NE. The basic fuel injection amount is fed back to be corrected based upon the outputs from the upstream air-fuel ratio sensor 178a and the downstream air-fuel ratio sensor 178b, whereby a final fuel injection amount is calculated. The control apparatus 2 issues a fuel injection instruction in the final fuel injection amount to the injector 127. Thus, the fuel in final fuel injection amount is injected from the injector 127 at a predetermined timing, whereby the air-fuel ratio is controlled to agree with the target air-fuel ratio.

(Control of Intake Valve Closing Timing, Mechanical Compression Ratio, and Ignition Timing)

The closing timing of the intake valve 123 is referred to as "IVC", and the actual timing of the IVC is referred to as "IVCa" below. The mechanical compression ratio is referred to as "$\epsilon m$", and the actual value of $\epsilon m$ is referred to as "$\epsilon ma$". The actual compression ratio is referred to as "$\epsilon c$", and the actual value of $\epsilon c$ is referred to as "$\epsilon ca$". The ignition timing is referred to as "SA". The $\epsilon ca$ is calculated from IVCa and $\epsilon ma$.

The present embodiment employs a pattern corresponding to the ultra high expansion cycle, described in the "DISCLOSURE OF THE INVENTION", as the control pattern of the IVC and $\epsilon m$. Specifically, with the state in which the throttle valve opening degree TA is kept to be the maximum state in principle, the IVC and $\epsilon m$ are adjusted according to the load (required load, corresponding to a later-described required cylinder intake air quantity Mct) required by a driver (a driver of the system S (vehicle)) and the engine revolution NE.

The IVC is adjusted to be the retard angle side, as the Mct (and NE) is smaller, within a region where the IVC is considerably retarded from the intake bottom dead center (e.g., the region where the IVC is retarded from the intake bottom dead center by 90° CA or more). The $\epsilon m$ is adjusted to be a greater value, as the Mct (and NE) is smaller, within a region where the $\epsilon m$ is extremely great (e.g., a region where the $\epsilon m$ is 20 or more). With this, the cylinder intake air quantity (accordingly, the output torque of the internal combustion engine 1) is adjusted according to the Mct, while the expansion ratio is kept to be a very great value (e.g., 20 or more) and the $\epsilon c$ is kept to be an appropriate range by which the combustion state becomes satisfactory (e.g., 8 to 9).

More specifically, in the present embodiment, the IVC, $\epsilon m$, and SA are generally controlled to agree with current IVCt, the current $\epsilon mt$, and the current SAt. The IVCt, $\epsilon mt$, and SAt are the reference timing of the IVC, the reference value of $\epsilon m$, and the reference timing of the SA. The current IVCt, the current $\epsilon mt$, and the current SAt are optimum intake valve closing timing (a steady adapted timing), mechanical compression ratio (steady adapted value), and ignition timing (steady adapted timing), considering the combustion state, the fuel efficiency, and the output torque, in case where the system is in a steady driving mode with the current combination of "Mct and NE". The current IVCt is determined by the current combination of "Mct and NE" and a map created through an experiment and specifying the relationship between the combination of "Mct and NE" and the IVCt. The current $\epsilon mt$ is determined by the current combination of "Mct and NE" and a map created through an experiment and specifying the relationship between the combination of "Mct and NE" and the $\epsilon mt$. The current SAt is determined by the current combination of "Mct and NE" and a map created through an experiment and specifying the relationship between the combination of "Mct and NE" and the SAt. The actual compression ratio calculated from the IVCt and $\epsilon mt$ is referred to as a reference value (steady adapted value, $\epsilon ct$) of the $\epsilon c$. The $\epsilon ct$ is 8 to 9, for example.

When the IVCa agrees with the IVCt and the $\epsilon ma$ agrees with the $\epsilon mt$ because the variable intake valve timing apparatus 125 and the variable compression ratio mechanism 14 are appropriately operated, the $\epsilon ca$ agrees with the $\epsilon ct$. Therefore, the optimum driving condition is attained in view of the combustion state, the fuel efficiency, and the output torque.

There may be the case in which the IVCa is shifted from the IVCt, or the $\epsilon ma$ is shifted from the $\epsilon mt$, because of the response delay of the variable intake valve timing apparatus 125 and the variable compression ratio mechanism 14, in a transient driving condition. In this case, the $\epsilon ca$ is shifted from the $\epsilon ct$. When the $\epsilon ca$ is shifted to be greater than the $\epsilon ct$, the knocking is liable to occur. On the other hand, when the $\epsilon ca$ is shifted to be smaller than the $\epsilon ct$, the combustion state is liable to deteriorate (including the occurrence of misfire).

Accordingly, when the $\epsilon ca$ is shifted to be greater than the $\epsilon ct$, a countermeasure has to be taken in order to suppress the occurrence of the knocking. When the $\epsilon ca$ is shifted to be smaller than the $\epsilon ct$, a countermeasure has to be taken in order to suppress the deterioration in the combustion state (including the occurrence of misfire).

As the case in which the $\epsilon ca$ is shifted to be greater than the $\epsilon ct$, there are two cases considered, which are the case in which the $\epsilon ma$ is shifted to be greater than the $\epsilon mt$, and the case in which the IVCa is shifted to the advance angle side from the IVCt. As the case in which the $\epsilon ca$ is shifted to be smaller than the $\epsilon ct$, there are two cases considered, which are the case in which the $\epsilon ma$ is shifted to be smaller than the $\epsilon mt$, and the case in which the IVCa is shifted to the retard angle side from the IVCt. Thus, there are four cases considered as the case in which the $\epsilon ca$ is shifted from the $\epsilon ct$.

For the sake of convenience of description, the control to allow the IVCa to agree with the retard angle side (advance angle side) from the IVCt, not to agree with the IVCt, is referred to as "IVC retard correction (IVC advance correction)", or merely referred to as "IVC correction". The control to allow the $\epsilon ma$ to agree with the greater value (smaller value) from the $\epsilon mt$, not to agree with the $\epsilon mt$, is referred to as "$\epsilon m$ increase correction ($\epsilon m$ decrease correction)", or merely referred to as "$\epsilon m$ correction". The control to allow the SAa to agree with the retard angle side (advance angle side) from the SAt, not to agree with the SAt, is referred to as "SA retard correction (SA advance correction)", or merely referred to as "SA correction". The control to set the throttle valve opening degree TA to be a value smaller than the maximum state, instead of to keep the throttle valve opening degree TA to be the maximum state, is referred to as "TA decrease correction".

As a first countermeasure in case where the $\epsilon ca$ is shifted to be greater than the $\epsilon ct$ (i.e., when the occurrence of the knocking has to be prevented), it is considered that one of the IVCa and $\epsilon ma$, which is not shifted, is controlled to agree with a value different from the reference value (the corresponding one of the IVCt and $\epsilon mt$), not to agree with the reference value, in order to return the $\epsilon ca$ to the $\epsilon ct$. Specifically, when the $\epsilon ma$ is shifted to be greater than the $\epsilon mt$, the IVC retard correction is executed to return the $\epsilon ca$ to the $\epsilon ct$. When the IVCa is shifted to the advance angle side from the IVCt, the $\epsilon m$ decrease correction is executed to return the $\epsilon ca$ to the $\epsilon ct$.

On the other hand, the occurrence of the knocking can be suppressed by controlling the SA toward the retard angle side from the SAt, so long as the $\epsilon ca$ is not excessively shifted toward the greater side from the $\epsilon ct$. Specifically, as a second countermeasure in case where the $\epsilon ca$ is shifted to be greater than the $\epsilon ct$ (i.e., when the occurrence of the knocking has to be prevented), it is considered that the SA retard correction is executed, while maintaining the shift of the $\epsilon ca$ from the $\epsilon ct$.

On the contrary, as a first countermeasure when the $\epsilon ca$ is shifted to be smaller than the $\epsilon ct$ (i.e., when the deterioration of the combustion state (including the occurrence of misfire)

has to be prevented), it is considered that one of the IVCa and $\epsilon$ma, which is not shifted, is controlled to agree with a value different from the reference value (the corresponding one of the IVCt and $\epsilon$mt), not to agree with the reference value, in order to return the $\epsilon$ca to the $\epsilon$ct. Specifically, when the $\epsilon$ma is shifted to be smaller than the $\epsilon$mt, the IVC advance correction is executed to return the $\epsilon$ca to the $\epsilon$ct. When the IVCa is shifted to the retard angle side from the IVCt, the $\epsilon$m increase correction is executed to return the $\epsilon$ca to the $\epsilon$ct.

On the other hand, the deterioration of the combustion state (including the occurrence of misfire) can be suppressed by controlling the SA toward the advance angle side from the SAt, so long as the $\epsilon$ca is not excessively shifted toward the greater side from the $\epsilon$ct. Specifically, as a second countermeasure in case where the $\epsilon$ca is shifted to be smaller than the $\epsilon$ct (i.e., when the deterioration of the combustion state (including the occurrence of misfire) has to be prevented), it is considered that the SA advance correction is executed, while maintaining the shift of the $\epsilon$ca from the $\epsilon$ct.

As described above, with respect to the above-mentioned four cases in which the $\epsilon$ca is shifted from the $\epsilon$ct, there are two countermeasures, which are the countermeasure of "executing the IVC correction or $\epsilon$m correction in order to return the $\epsilon$ca to the $\epsilon$ct" and the countermeasure of "executing the SA correction with the shift of the $\epsilon$ca from the $\epsilon$ct being maintained (so long as the shift amount of the $\epsilon$ca falls within the range correctable by the SA correction)". Accordingly, it is a problem which countermeasure is taken for each of the above-mentioned four cases.

Which one of the countermeasures is employed in the present embodiment will sequentially be described below for each of the four cases with reference to FIGS. 2 to 17. In the present embodiment, "in the case in which to secure an output torque required by a driver takes first priority, a pattern having the best fuel efficiency" is selected. It will be described below, supposing that the current IVCt, $\epsilon$mt, and $\epsilon$ct are respectively IVC0, $\epsilon$m0, and $\epsilon$c0.

<Case in which $\epsilon$ma is Shifted to be Greater than $\epsilon$mt (IVCa Agrees with IVCt)>

Figure 2:
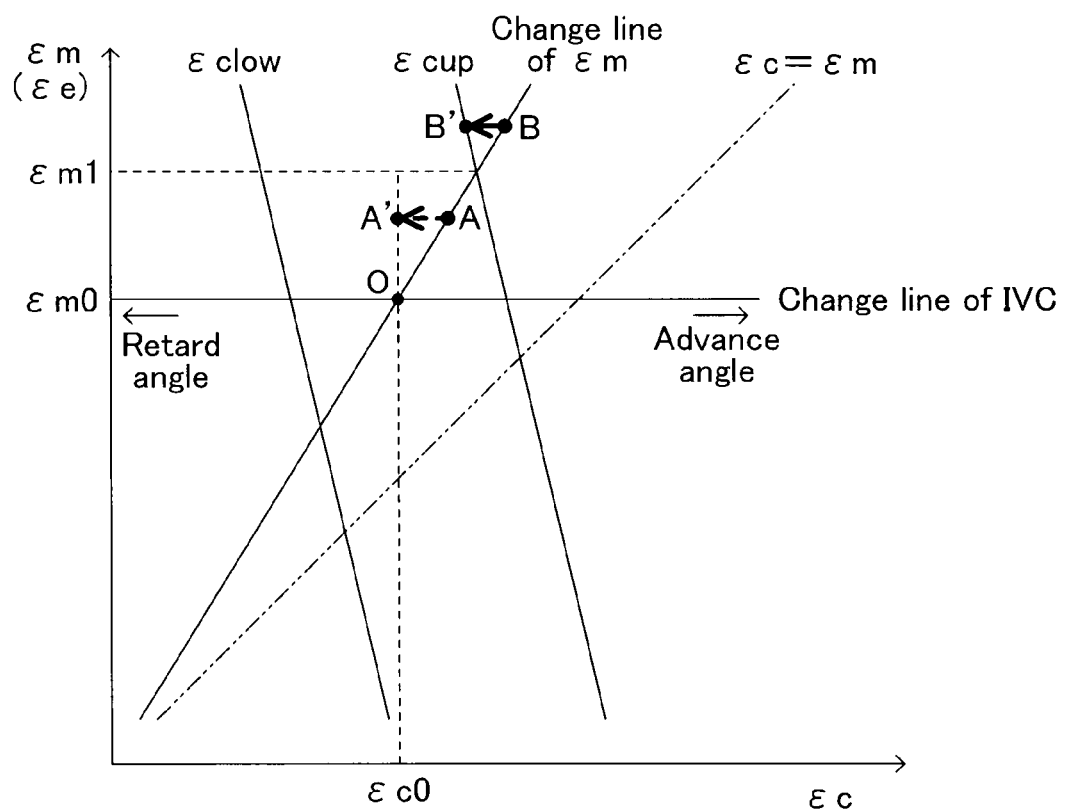
FIG. 2 is a graph illustrating a change in a relationship between an actual compression ratio and a mechanical compression ratio, when an intake valve closing timing retard correction is executed in case where an actual value of the mechanical compression ratio is shifted to a greater side from a reference value of the mechanical compression ratio.

FIG. 2 illustrates the case in which, in case where ($\epsilon$ct, $\epsilon$mt) corresponds to a point O ($\epsilon$c0, $\epsilon$m0), the $\epsilon$ca is shifted to be greater than the $\epsilon$ct because of the shift of the $\epsilon$ma toward the greater side from the $\epsilon$mt, and hence, ($\epsilon$ca, $\epsilon$ma) is shifted from the point O to a point A or a point B (IVCa agrees with the IVCt). When the IVC is constant, the trajectory of ($\epsilon$c, $\epsilon$m) caused by the change in the $\epsilon$m becomes a straight line parallel to the "change line of $\epsilon$m" illustrated in FIG. 2.

Figure 3:
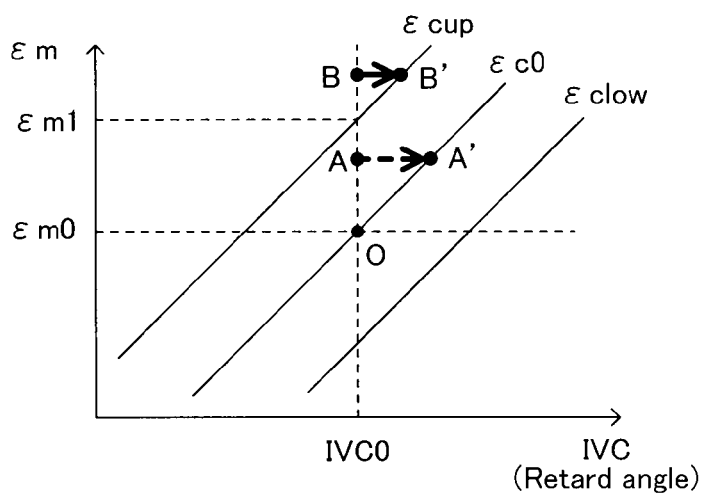
FIG. 3 is a graph, corresponding to FIG. 2, illustrating a change in the relationship between the intake valve closing timing and the mechanical compression ratio.

FIG. 3 illustrates the case in which, in case where (IVCt, $\epsilon$mt) corresponds to the point O (IVC0, $\epsilon$m0), (IVCa, $\epsilon$ma) is shifted from the point O to the point A or the point B as a result of the shift of the $\epsilon$ma toward the greater side from the $\epsilon$mt (IVCa agrees with the IVCt).

As illustrated in FIGS. 2 and 3, $\epsilon$cup and $\epsilon$clow are an upper limit value and a lower limit value, respectively, by which the appropriate combustion state can be continued even if the SA correction is executed. The $\epsilon$cup corresponds to the upper limit in the range of the $\epsilon$ca by which the occurrence of the knocking can be suppressed by the SA retard correction. More specifically, since the degree of the occurrence of the knocking increases, as the shift amount of the $\epsilon$ma toward the greater side from the $\epsilon$mt is great (accordingly, as the shift mount of the $\epsilon$ca toward the greater side from the $\epsilon$ct is great), the amount of the retard angle of the SA has to be increased. From this viewpoint, when the amount of the retard angle in the SA retard correction is gradually increased in case where the $\epsilon$ma is gradually shifted to be greater than the $\epsilon$mt (accordingly, when the $\epsilon$ca is gradually shifted to be greater than the $\epsilon$ct), misfire might be caused at a certain point, because of the excessive amount of the retard angle of the SA. The $\epsilon$ca corresponding to this point corresponds to the $\epsilon$cup.

On the other hand, the $\epsilon$clow corresponds to the lower limit in the range of the $\epsilon$ca by which the deterioration in the combustion state (including the occurrence of misfire) can be suppressed by the SA advance correction. More specifically, since the degree of the deterioration in the combustion state increases, as the shift amount of the $\epsilon$ma toward the smaller side from the $\epsilon$mt is great (accordingly, as the shift mount of the $\epsilon$ca toward the smaller side from the $\epsilon$ct is great), the amount of the advance angle of the SA has to be increased. From this viewpoint, when the amount of the advance angle in the SA advance correction is gradually increased in case where the $\epsilon$ma is gradually shifted to be smaller than the $\epsilon$mt (accordingly, when the $\epsilon$ca is gradually shifted to be smaller than the $\epsilon$ct), misfire might be caused at a certain point, because of the very small amount of the $\epsilon$ca. The $\epsilon$ca corresponding to this point corresponds to the $\epsilon$clow. As can be understood from FIG. 2, the $\epsilon$cup and $\epsilon$clow are dependent on the $\epsilon$ma, wherein the $\epsilon$cup and $\epsilon$clow decrease, as the $\epsilon$ma increases. As can be understood from FIGS. 2 and 3, the point A corresponds to the case where the $\epsilon$ca is not more than the $\epsilon$up, and the point B corresponds to the case where the $\epsilon$ca exceeds the $\epsilon$up.

The case where the ($\epsilon$ca, $\epsilon$ma) is shifted from the point O to the point A in FIG. 2 (i.e., where the (IVCa, $\epsilon$ma) is shifted from the point O to the point A in FIG. 3) will firstly be described below. As described above, when the $\epsilon$ma is shifted to be greater than the $\epsilon$mt, the $\epsilon$ca becomes greater than the $\epsilon$ct. Therefore, in order to suppress the occurrence of the knocking, the IVC retard correction or the SA retard correction can be selected. When the IVC retard correction is executed to return the $\epsilon$ca to the $\epsilon$ct (=$\epsilon$c0), the ($\epsilon$ca, $\epsilon$ma) is moved from the point A to a point A' in FIG. 2, while the (IVCa, $\epsilon$ma) is moved from the point A to the point A' in FIG. 3. When the $\epsilon$m is constant in this case, the trajectory of the ($\epsilon$c, $\epsilon$m) caused by the change in the IVC becomes a straight line parallel to the "change line of the IVC" illustrated in FIG. 2. On the other hand, when the SA retard correction is executed, the $\epsilon$ca and the $\epsilon$ma are kept constant. Therefore, the ($\epsilon$ca, $\epsilon$ma) is kept to be on the point A in FIG. 2, while the (IVCa, $\epsilon$ma) is kept to be on the point A in FIG. 3.

When the IVC retard correction is executed, the cylinder intake air quantity is directly reduced, so that the output torque of the internal combustion engine 1 is liable to reduce. On the other hand, the output torque is difficult to be reduced, even when the SA retard correction is executed. From the above, the output torque can easily be more secured by the SA retard correction than by the IVC retard correction. Accordingly, in the present embodiment, the SA retard correction is selected and executed, so long as the $\epsilon$ca is not more than the $\epsilon$cup. Specifically, the ($\epsilon$ca, $\epsilon$ma) is kept to be on the point A in FIG. 2, while the (IVCa, $\epsilon$ma) is kept to be on the point A in FIG. 3. Additionally, as the shift amount of the $\epsilon$ma to the greater side from the $\epsilon$mt (accordingly, the shift amount of the $\epsilon$ca to the greater side from the $\epsilon$ct) is great, the amount of retard angle in the SA retard correction is more increased as described above.

The case where the ($\epsilon$ca, $\epsilon$ma) is shifted from the point O to the point B in FIG. 2 (i.e., where the (IVCa, $\epsilon$ma) is shifted from the point O to the point B in FIG. 3) will next be described below. In this case, the $\epsilon$ca is greater than $\epsilon$cup. Therefore, the occurrence of the knocking cannot be suppressed (misfire might be generated) only by the SA retard correction. Therefore, the IVC retard correction is executed in addition to the SA retard correction in order that the $\epsilon$ca does not exceed the $\epsilon$cup (i.e., in order that the $\epsilon$ca agrees with the $\epsilon$cup) in the present embodiment. Specifically, the ($\epsilon$ca, $\epsilon$ma) is moved from the point B to a point B' in FIG. 2, while the (IVCa, $\epsilon$ma) is moved from the point B to the point B' in FIG. 3. In this case, the amount of retard angle in the IVC retard correction is calculated from the $\epsilon$ma and the $\epsilon$cup, and it assumes a greater value, as the shift amount of the $\epsilon$ca toward the greater side from the $\epsilon$cup. On the other hand, supposing that the $\epsilon$ma corresponding to the case in which the IVCa agrees with the IVC0 and the $\epsilon$ca agrees with the $\epsilon$cup is $\epsilon$m1 (see FIGS. 2, 3, and 4), the amount of retard angle in the SA retard correction is constant as the value corresponding to the case in which the $\epsilon$ma agrees with the $\epsilon$m1.

Figure 4:
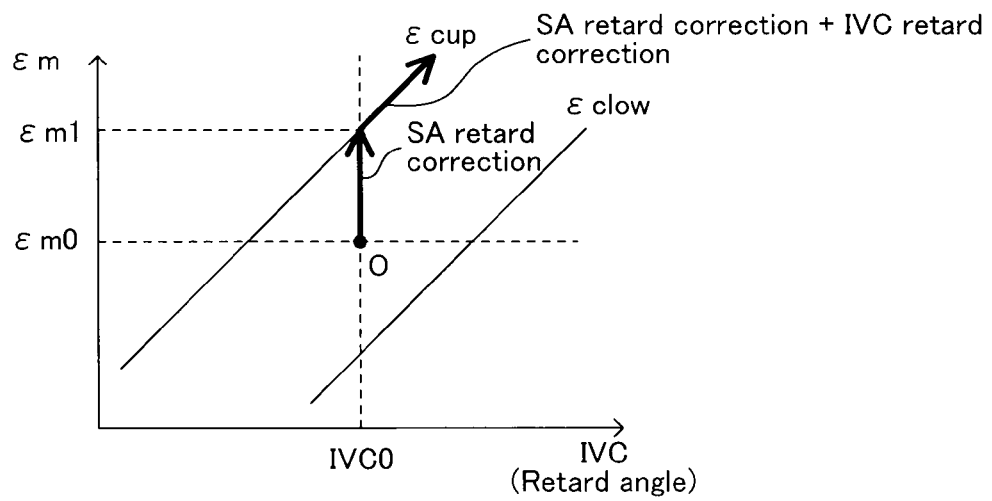
FIG. 4 is a graph illustrating a change in the relationship between the intake valve closing timing and the mechanical compression ratio, with respect to the increase in the shift amount of the actual value of the mechanical compression ratio from the reference value of the mechanical compression ratio, when various corrections are executed by the control apparatus illustrated in FIG. 1 in case where the actual value of the mechanical compression ratio is shifted to the greater side from the reference value of the mechanical compression ratio.

FIG. 4 illustrates the transition of the (IVCa, $\epsilon$ma) when the $\epsilon$ma is gradually shifted to b greater than the $\epsilon$mt (=$\epsilon$m0). Only the SA retard correction is executed in the process until the $\epsilon$ma increases from the $\epsilon$m0 to reach the $\epsilon$m1. Therefore, the IVCa is kept constant at the IVC0, and the amount of retard angle in the SA retard correction increases. During the process in which the $\epsilon$ma increases from the $\epsilon$m1, the SA retard correction+IVC retard correction are executed. Therefore, with the increase of the $\epsilon$ma, the IVCa is retarded from the IVC0 with the $\epsilon$ca being kept to be the $\epsilon$cup. As described above, the amount of retard angle in the SA retard correction is set to be constant as the value corresponding to the case in which the $\epsilon$ma agrees with the $\epsilon$m1.

<Case in which IVCa is Shifted Toward Advance Angle Side from IVCt ($\epsilon$ma Agrees with $\epsilon$mt>

Figure 5:
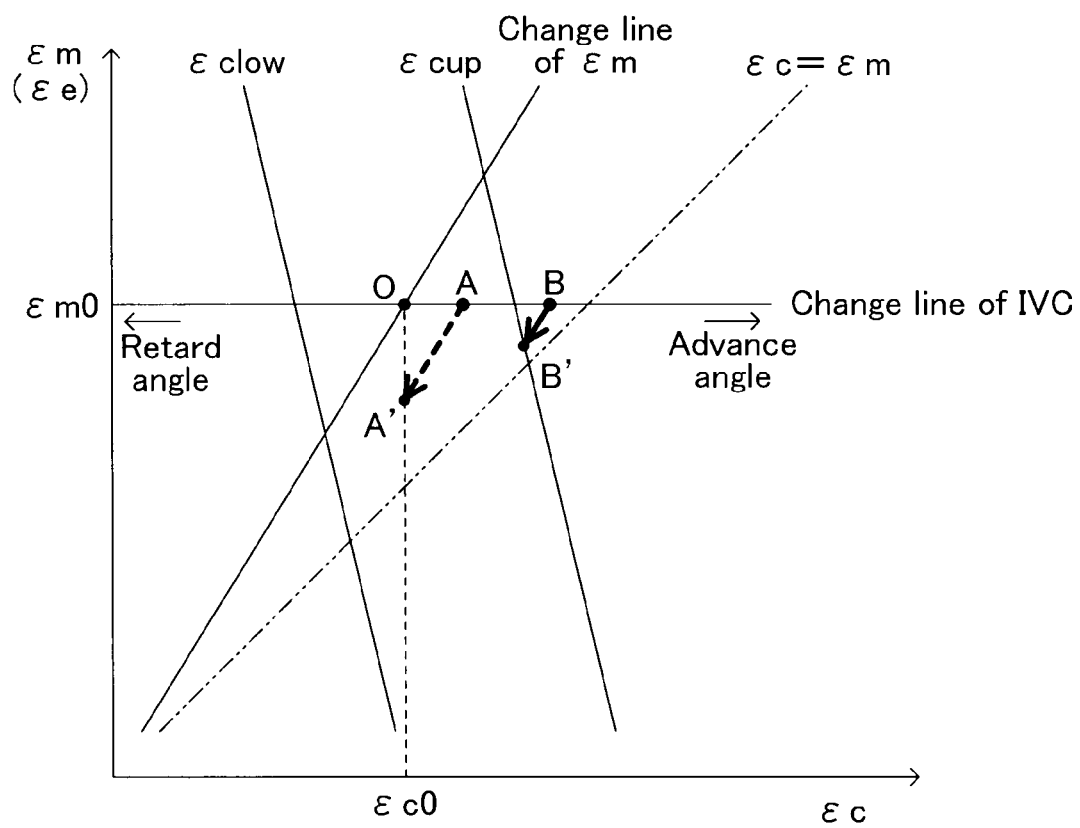
FIG. 5 is a graph illustrating a change in the relationship between the actual compression ratio and the mechanical compression ratio, when the mechanical compression ratio decrease correction is executed in case where the actual timing of the intake valve closing timing is shifted to an advance angle side from the reference timing of the intake valve closing timing.

FIG. 5 corresponds to FIG. 2, and illustrates the case in which, when the $\epsilon$ca is shifted to be greater than the $\epsilon$ct due to the shift of the IVCa toward the advance angle side from the IVCt in case where the ($\epsilon$ct, $\epsilon$mt) corresponds to the point O ($\epsilon$c0, $\epsilon$m0), the ($\epsilon$ca, $\epsilon$ma) is shifted from the point O to the point A or the point B (the $\epsilon$ma agrees with the $\epsilon$mt).

Figure 6:
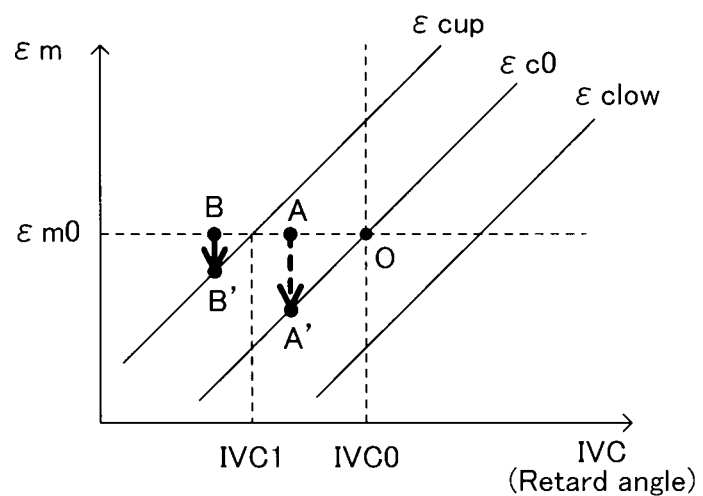
FIG. 6 is a graph, corresponding to FIG. 5, illustrating a change in the relationship between the intake valve closing timing and the mechanical compression ratio.

FIG. 6 corresponds to FIG. 3, and illustrates the case in which the (IVCa, $\epsilon$ma) is shifted from the point O to the point A or the point B (the $\epsilon$ma agrees with the $\epsilon$mt), as a result of the shift of the IVCa toward the advance angle side from the IVCt, when the (IVCt, $\epsilon$mt) corresponds to the point O (IVC0, $\epsilon$m0). Like FIGS. 2 and 3, the point A corresponds to the case in which the $\epsilon$ca is not more than the $\epsilon$cup, and the point B corresponds to the case in which the $\epsilon$ca exceeds the $\epsilon$cup in FIGS. 5 and 6.

The case where the ($\epsilon$ca, $\epsilon$ma) is shifted from the point O to the point A in FIG. 5 (i.e., where the (IVCa, $\epsilon$ma) is shifted from the point O to the point A in FIG. 6) will firstly be described below. As described above, when the IVCa is shifted to the advance angle side from the IVCt, the $\epsilon$ca becomes greater than the $\epsilon$ct. Therefore, in order to suppress the occurrence of the knocking, the $\epsilon$ma decrease correction or the SA retard correction can be selected. When the $\epsilon$ma decrease correction is executed to return the $\epsilon$ca to the $\epsilon$ct (=$\epsilon$c0), the ($\epsilon$ca, $\epsilon$ma) is moved from the point A to the point A' in FIG. 5, while the (IVCa, $\epsilon$ma) is moved from the point A to the point A' in FIG. 6. On the other hand, when the SA retard correction is executed, the $\epsilon$ca and the $\epsilon$ma are kept constant. Therefore, the ($\epsilon$ca, $\epsilon$ma) is kept to be on the point A in FIG. 5, while the (IVCa, $\epsilon$ma) is kept to be on the point A in FIG. 6.

Here, even if either one of the $\epsilon$ma decrease correction and the SA retard correction is executed, there is bare difference in the output torque of the internal combustion engine 1. On the other hand, when the $\epsilon$ma decease correction is executed, the expansion ratio is directly reduced, so that the fuel efficiency is liable to deteriorate. On the contrary, even when the SA retard correction is executed, the fuel efficiency is difficult to deteriorate. From the above, the fuel efficiency of the internal combustion engine 1 is easier to be enhanced by the SA retard correction than by the IVC retard correction. Accordingly, in the present invention, the SA retard correction is selected and executed, so long as the $\epsilon$ca is not more than the $\epsilon$cup. Specifically, the ($\epsilon$ca, $\epsilon$ma) is kept to be the point A in FIG. 5, while the (IVCa, $\epsilon$ma) is kept to be the point A in FIG. 6. Additionally, as the shift amount of the IVCa to the advance angle side from the IVCt (accordingly, the shift amount of the $\epsilon$ca to the greater side from the $\epsilon$ct) is great, the amount of retard angle in the SA retard correction is more increased as described above.

The case where the ($\epsilon$ca, $\epsilon$ma) is shifted from the point O to the point B in FIG. 5 (i.e., where the (IVCa, $\epsilon$ma) is shifted from the point O to the point B in FIG. 6) will next be described below. In this case, the $\epsilon$ca is greater than $\epsilon$cup. Therefore, the occurrence of the knocking cannot be suppressed (misfire might be generated) only by the SA retard correction. Therefore, the $\epsilon$m decrease correction is executed in addition to the SA retard correction in order that the $\epsilon$ca does not exceed the $\epsilon$cup (i.e., in order that the $\epsilon$ca agrees with the $\epsilon$cup) in the present embodiment. Specifically, the ($\epsilon$ca, $\epsilon$ma) is moved from the point B to the point B' in FIG. 5, while the (IVCa, $\epsilon$ma) is moved from the point B to the point B' in FIG. 6. In this case, the decreased amount in the $\epsilon$m decrease correction is calculated from the IVCa and the $\epsilon$cup, and it assumes a greater value, as the shift amount of the $\epsilon$ca toward the greater side from the $\epsilon$cup becomes great. On the other hand, supposing that the IVCa corresponding to the case in which the $\epsilon$ma agrees with the $\epsilon$m0 and the $\epsilon$ca agrees with the $\epsilon$cup is IVC1 (see FIGS. 6 and 7), the amount of retard angle in the SA retard correction is constant as the value corresponding to the case in which the IVCa agrees with the IVC1.

Figure 7:
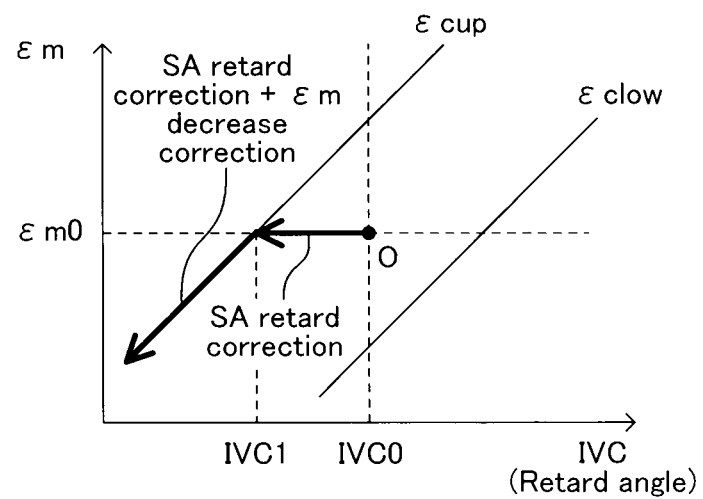
FIG. 7 is a graph illustrating a change in the relationship between the intake valve closing timing and the mechanical compression ratio, with respect to the increase in the shift amount of the actual timing of the intake valve closing timing from the reference timing of the intake valve closing timing, when various corrections are executed by the control apparatus illustrated in FIG. 1 in case where the actual timing of the intake valve closing timing is shifted to the advance angle side from the reference timing of the intake valve closing timing.

FIG. 7 corresponds to FIG. 4, and illustrates the transition of the (IVCa, $\epsilon$ma) in case where the IVCa is gradually shifted to the advance angle side from the IVCt (=IVC0). Only the SA retard correction is executed in the process until the IVCa advances from the IVC0 to reach the IVC1. Therefore, the $\epsilon$ma is kept constant at the $\epsilon$m0, and the amount of advance angle in the SA advance correction increases. During the process in which the IVCa advances from the IVC1, the SA retard correction+$\epsilon$m decrease correction are executed. Therefore, with the advance of the IVCa, the $\epsilon$ma is decreased from the $\epsilon$m0 with the $\epsilon$ca being kept to be the $\epsilon$cup. As described above, the amount of retard angle in the SA retard correction is set to be constant as the value corresponding to the case in which the IVCa agrees with the IVC1.

<Case in which $\epsilon$ma is Shifted to be Smaller than $\epsilon$mt (IVCa Agrees with IVCt)>

Figure 8:
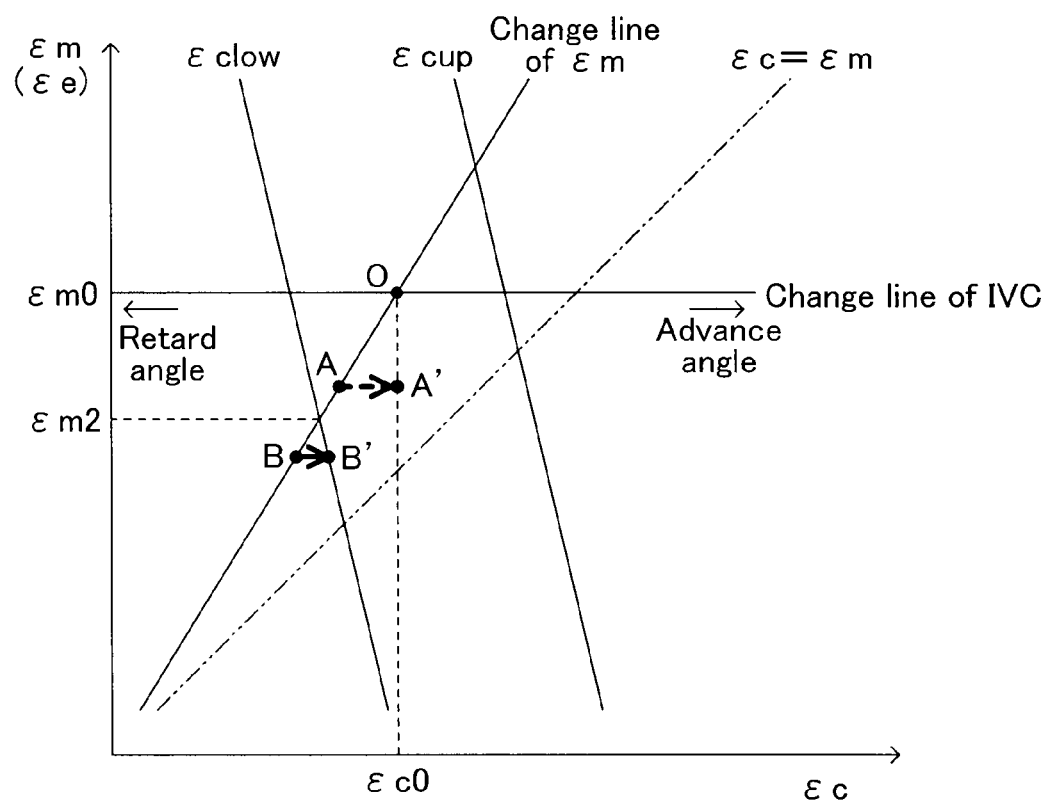
FIG. 8 is a graph illustrating a change in the relationship between the actual compression ratio and the mechanical compression ratio, when an intake valve closing timing advance correction is executed in case where the actual value of the mechanical compression ratio is shifted to a smaller side from the reference value of the mechanical compression ratio.

FIG. 8 corresponds to FIG. 2, and illustrates the case in which, in case where ($\epsilon$ct, $\epsilon$mt) corresponds to the point O ($\epsilon$c0, $\epsilon$m0), the $\epsilon$ca is shifted to be smaller than the $\epsilon$ct because of the shift of the $\epsilon$ma to be smaller than the $\epsilon$mt, and hence, the ($\epsilon$ca, $\epsilon$ma) is shifted from the point O to the point A or the point B (IVCa agrees with the IVCt).

Figure 9:
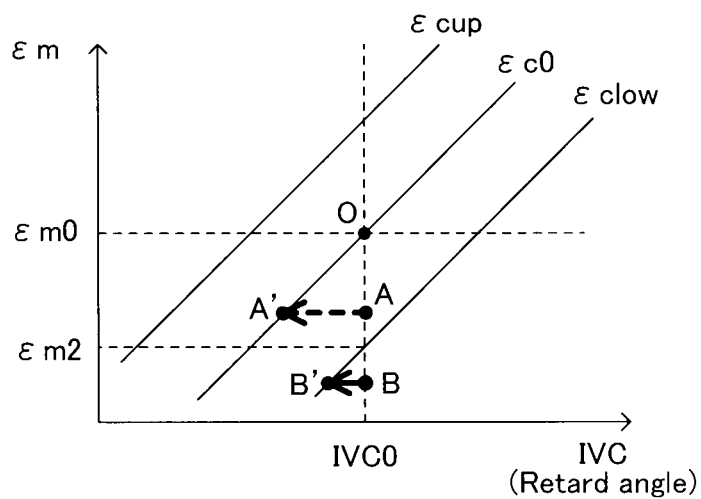
FIG. 9 is a graph, corresponding to FIG. 8, illustrating a change in the relationship between the intake valve closing timing and the mechanical compression ratio.

FIG. 9 corresponds to FIG. 3, and illustrates the case in which, in case where the (IVCt, $\epsilon$mt) corresponds to the point O (IVC0, $\epsilon$m0), the (IVCa, $\epsilon$ma) is shifted from the point O to the point A or the point B as a result of the shift of the $\epsilon$ma to be smaller than the $\epsilon$mt (IVCa agrees with the IVCt). In FIGS. 8 and 9, the point A corresponds to the case where the $\epsilon$ca is not less than the $\epsilon$clow, while the point B corresponds to the case where the $\epsilon$ca is less than the $\epsilon$clow.

The case where the ($\epsilon$ca, $\epsilon$ma) is shifted from the point O to the point A in FIG. 8 (i.e., where the (IVCa, $\epsilon$ma) is shifted from the point O to the point A in FIG. 9) will firstly be described below. As described above, when the $\epsilon$ma is shifted to be smaller than the $\epsilon$mt, the $\epsilon$ca becomes smaller than the εct. Therefore, in order to suppress the deterioration of the combustion state (including the occurrence of misfire), the IVC advance correction or the SA advance correction can be selected. When the IVC advance correction is executed to return the εca to the εct (=εc0), the (εca, εma) is moved from the point A to the point A' in FIG. 8, while the (IVCa, εma) is moved from the point A to the point A' in FIG. 9. When the IVC advance correction is executed, the TA decrease correction is simultaneously executed in order to prevent the increase in the cylinder intake air quantity. On the other hand, when the SA advance correction is executed, the εca and the εma are kept constant. Therefore, the (εca, εma) is kept to be on the point A in FIG. 8, while the (IVCa, εma) is kept to be on the point A in FIG. 9.

Here, even if either one of the IVC advance correction and the SA advance correction is executed, there is bare difference in the output torque of the internal combustion engine 1. On the other hand, when the IVC advance correction is executed, the TA decrease correction is simultaneously executed. When the TA decrease correction is executed, the intake resistance in the intake path increases, so that the fuel efficiency is liable to deteriorate. On the contrary, even when the SA advance correction is executed, the fuel efficiency is difficult to deteriorate. From the above, the fuel efficiency of the internal combustion engine 1 is easier to be enhanced by the SA advance correction than by the IVC advance correction. Accordingly, in the present embodiment, the SA advance correction is selected and executed, so long as the εca is not less than the εclow. Specifically, the (εca, εma) is kept to be on the point A in FIG. 8, while the (IVCa, εma) is kept to be on the point A in FIG. 9. Additionally, as the shift amount of the εma toward the smaller side from the εmt (accordingly, the shift amount of the εca toward the smaller side from the εct) is great, the amount of advance angle in the SA advance correction is more increased as described above.

The case where the (εca, εma) is shifted from the point O to the point B in FIG. 8 (i.e., where the (IVCa, εma) is shifted from the point O to the point B in FIG. 9) will next be described below. In this case, the εca is smaller than εclow. Therefore, the deterioration of the combustion state cannot be suppressed (misfire might be generated) only by the SA advance correction. Therefore, the IVC advance correction is executed in addition to the SA advance correction in order that the εca does not become less than the εclow (i.e., in order that the εca agrees with the εclow) in the present embodiment. Specifically, the (εca, εma) is moved from the point B to the point B' in FIG. 8, while the (IVCa, εma) is moved from the point B to the point B' in FIG. 9. In this case, the amount of advance angle in the IVC advance correction is calculated from the εma and the εclow, and it assumes a greater value, as the shift amount of the εca toward the smaller side from the εclow increases. On the other hand, supposing that the εma corresponding to the case in which the IVCa agrees with the IVC0 and the εca agrees with the εclow is εm2 (see FIGS. 8, 9, and 10), the amount of advance angle in the SA advance correction is constant as the value corresponding to the case in which the εma agrees with the εm2.

Figure 10:
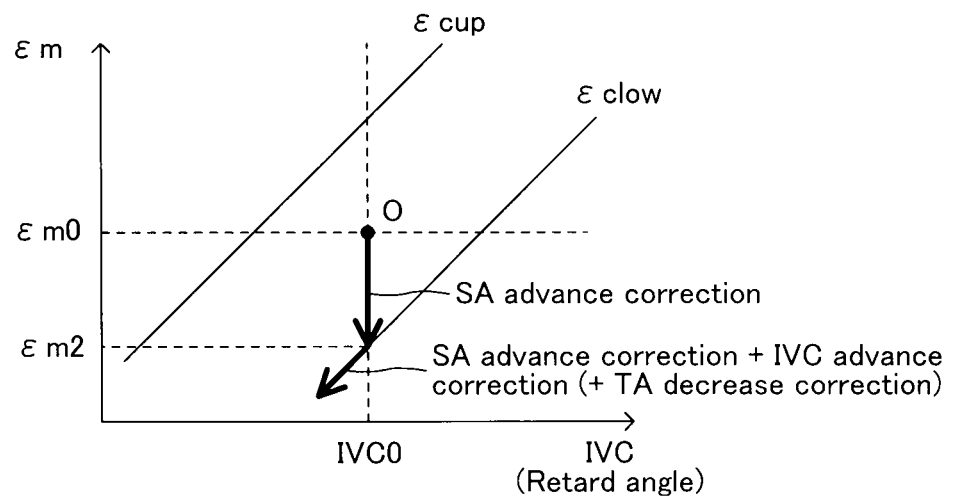
FIG. 10 is a graph illustrating a change in the relationship between the intake valve closing timing and the mechanical compression ratio, with respect to the increase in the shift amount of the actual value of the mechanical compression ratio from the reference value of the mechanical compression ratio, when various corrections are executed by the control apparatus illustrated in FIG. 1 in case where the actual value of the mechanical compression ratio is shifted to the smaller side from the reference value of the mechanical compression ratio.

FIG. 10 corresponds to FIG. 4, and illustrates the transition of the (IVCa, εma) in case where the εma is gradually shifted to the smaller side from the εmt (=εm0). Only the SA advance correction is executed in the process until the εma decreases from the εm0 to reach the εm2. Therefore, the IVCa is kept constant at the IVC0, and the amount of advance angle in the SA advance correction increases. During the process in which the εma decreases from the εm2, the SA advance correction+ IVC advance correction (+TA decrease correction) are executed. Therefore, with the decrease of the εma, the IVCa advances from the IVC0 with the εca being kept to be the εclow. As described above, the amount of advance angle in the SA advance correction is set to be constant as the value corresponding to the case in which the εma agrees with the εm2.

<Case in which IVCa is Shifted to Retard Angle Side from IVCt (εma Agrees with εmt)>

Figure 11:
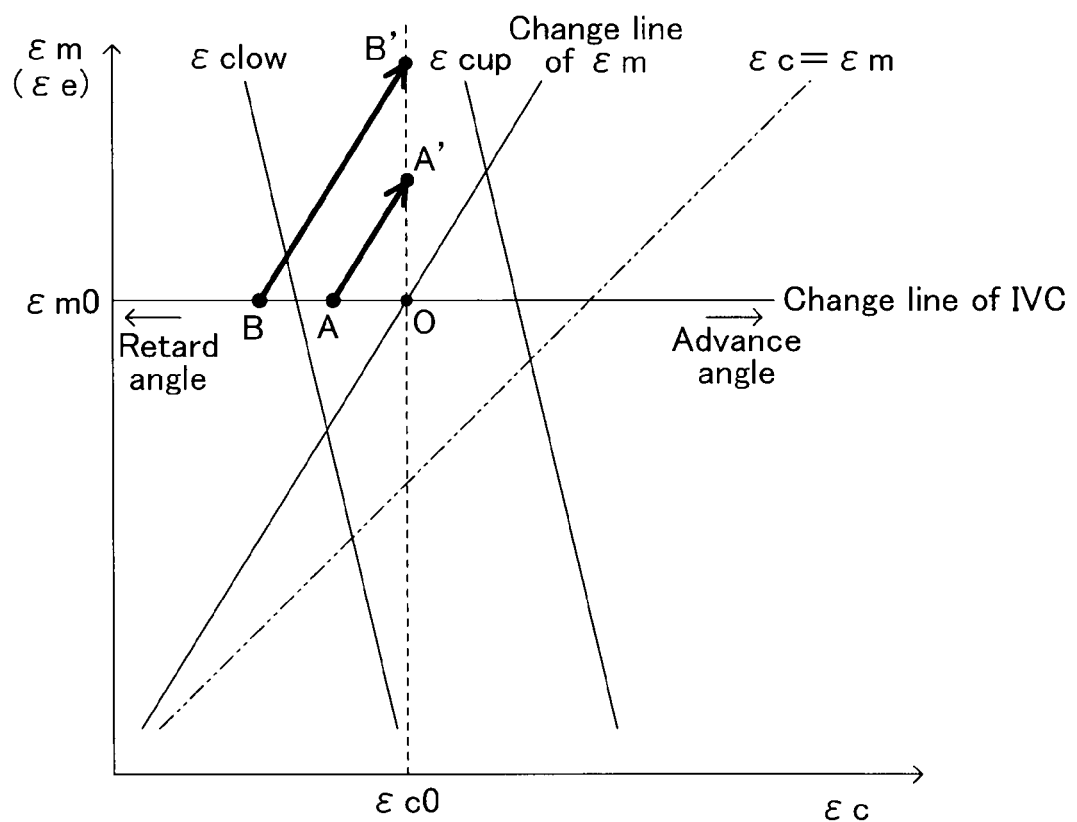
FIG. 11 is a graph illustrating a change in the relationship between the actual compression ratio and the mechanical compression ratio, when a mechanical compression ratio increase correction is executed in case where the actual timing of the intake valve closing timing is shifted to a retard angle side from the reference timing of the intake valve closing timing.

FIG. 11 corresponds to FIG. 2, and illustrates the case in which, in case where the (εct, εmt) corresponds to the point O (εc0, εm0), the εca is shifted to be smaller than the εct because of the shift of the IVCa to the retard angle side from the IVCt, and hence, the (εca, εma) is shifted from the point O to the point A or the point B (εma agrees with the εmt).

Figure 12:
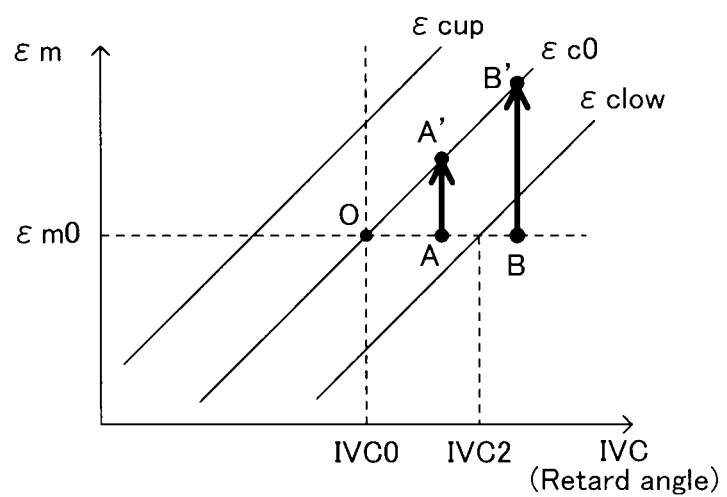
FIG. 12 is a graph, corresponding to FIG. 11, illustrating a change in the relationship between the intake valve closing timing and the mechanical compression ratio.

FIG. 12 corresponds to FIG. 3, and illustrates the case in which, in case where the (IVCt, εmt) corresponds to the point O (IVC0, εm0), the (IVCa, εma) is shifted from the point O to the point A or the point B as a result of the shift of the IVCa to the retard angle side from the IVCt (εma agrees with the εmt). In FIGS. 11 and 12, the point A corresponds to the case where the εca is not less than the εclow, while the point B corresponds to the case where the εca is less than the εclow, as in FIGS. 8 and 9.

The case where the (εca, εma) is shifted from the point O to the point A in FIG. 11 (i.e., where the (IVCa, εma) is shifted from the point O to the point A in FIG. 12) will firstly be described below. As described above, when the IVCa is shifted to the retard angle side from the IVCt, the εca becomes smaller than the εct. Therefore, in order to suppress the deterioration of the combustion state (including the occurrence of misfire), the εm increase correction or the SA advance correction can be selected. When the εm increase correction is executed to return the εca to the εct (=εc0), the (εca, εma) is moved from the point A to the point A' in FIG. 11, while the (IVCa, εma) is moved from the point A to the point A' in FIG. 12. When the SA advance correction is executed, the εca and the εma are kept constant. Therefore, the (εca, εma) is kept to be on the point A in FIG. 11, while the (IVCa, εma) is kept to be on the point A in FIG. 12.

When the IVCa is shifted to the retard angle side from the IVCt, the cylinder intake air quantity is reduced to decrease the output torque of the internal combustion engine 1, due to the shift of the IVC toward the retard angle side. Even if the SA advance correction is executed in this case, the output torque of the internal combustion engine 1 is difficult to increase (difficult to restore). On the other hand, when the εm increase correction is executed, the expansion ratio is directly increased to enhance a thermal efficiency, with the result that the output torque of the internal combustion engine 1 is easy to increase (to restore). From the above, the εm increase correction is selected and executed, so long as the εca is not less than the εclow in the present embodiment. Specifically, the (εca, εma) is moved from the point A to the point A' in FIG. 11, while the (IVCa, εma) is moved from the point A to the point A' in FIG. 12. Thus, the εca is returned to be εct (=εc0). The amount of the increase in the εm increase correction is calculated from the IVCa and the εct (=εc0), and as the shift amount of the εca toward the smaller side from the εc0 increases, it assumes a greater value.

The case where the (εca, εma) is shifted from the point O to the point B in FIG. 11 (i.e., where the (IVCa, εma) is shifted from the point O to the point B in FIG. 12) will next be described below. In this case (i.e., even when the εca becomes less than the εclow), the εm increase correction is selected and executed by the same reason as the case in which the (εca, εma) is shifted from the point O to the point A in FIG. 11. Specifically, the (εca, εma) is moved from the point B to the point B' in FIG. 11, while the (IVCa, εma) is moved from the point B to the point B' in FIG. 12. Thus, the $\epsilon ca$ is returned to be the $\epsilon ct$ (=$\epsilon c0$). The amount of the increase in the $\epsilon m$ increase correction is calculated from the IVCa and the $\epsilon ct$ (=$\epsilon c0$), and as the shift amount of the $\epsilon ca$ toward the smaller side from the $\epsilon c0$ increases, it assumes a greater value.

Figure 13:
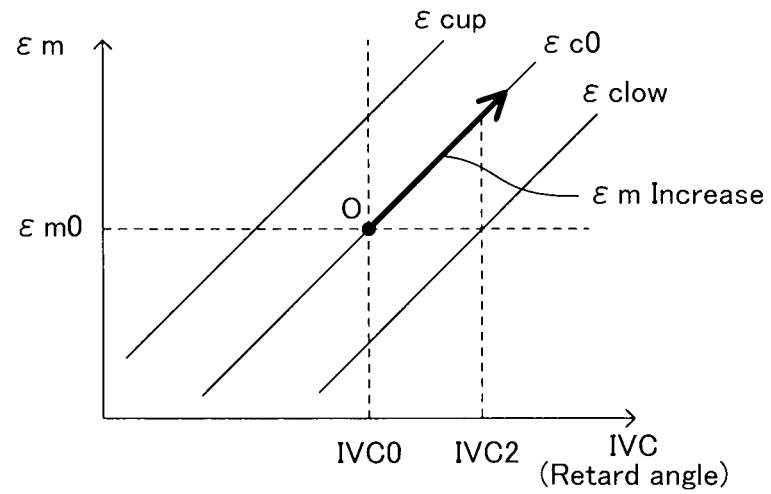
FIG. 13 is a graph illustrating a change in the relationship between the intake valve closing timing and the mechanical compression ratio, with respect to the increase in the shift amount of the actual timing of the intake valve closing timing from the reference timing of the intake valve closing timing, when various corrections are executed by the control apparatus illustrated in FIG. 1 in case where the actual timing of the intake valve closing timing is shifted to the retard angle side from the reference timing of the intake valve closing timing.

FIG. 13 corresponds to FIG. 4, and illustrates the transition of the (IVCa, $\epsilon ma$) in case where the IVCa is gradually shifted to the advance angle side from the IVCt (=IVC0). It is supposed that the IVCa corresponding to the case in which the $\epsilon ma$ agrees with the $\epsilon m0$ and the $\epsilon ca$ agrees with the $\epsilon clow$ is IVC2 (see FIGS. 12 and 13). In this case, regardless of which one of the IVCa and the IVC2 is greater, only the $\epsilon m$ increase correction is executed during the process in which the IVCa is retarded from the IVC0. Therefore, the $\epsilon ma$ increases from the $\epsilon m0$ with the $\epsilon ca$ being kept to be the $\epsilon c0$, with the retard of the IVCa. In this case, the SA correction is not executed, so that the SA is kept to be the SAt.

The countermeasures for selecting "a pattern having the best fuel efficiency in the case in which to secure an output torque required by a driver takes first priority" for each of the above-mentioned four cases have been described above in the present embodiment. The present embodiment is summed up below with reference to FIGS. 14 to 17.

Figure 14:
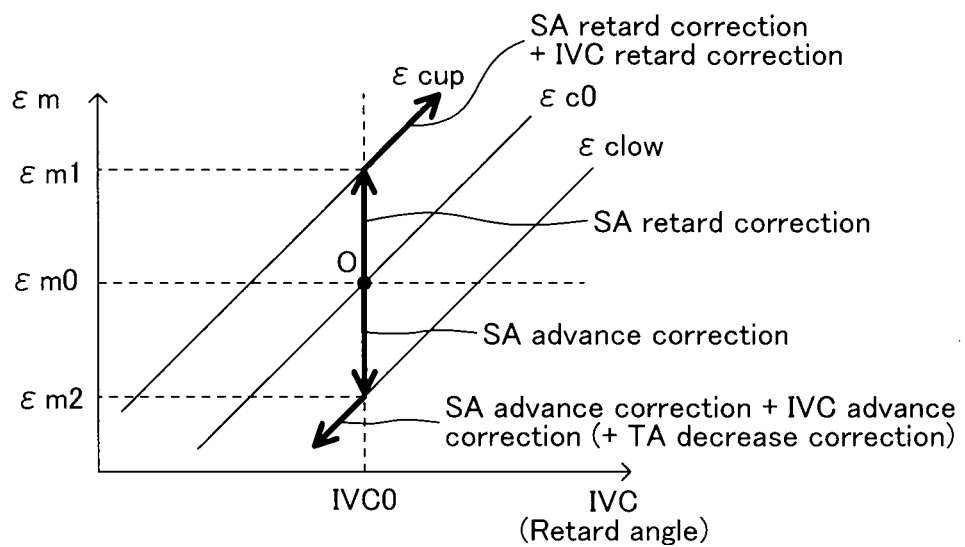
FIG. 14 is a graph illustrating both the changes in the relationship between the intake valve closing timing and the mechanical compression ratio with respect to the increase in the shift amount of the actual value of the mechanical compression ratio from the reference value of the mechanical compression ratio illustrated in FIGS. 4 and 10.

FIG. 14 illustrates the transitions of the (IVCa, $\epsilon ma$) illustrated in FIGS. 4 and 10. Specifically, FIG. 14 illustrates the transition of the (IVCa, $\epsilon ma$), when the present embodiment is applied in case where the $\epsilon ma$ is gradually shifted toward the greater side or toward the smaller side from the $\epsilon mt$ (=$\epsilon m0$).

Figure 15:
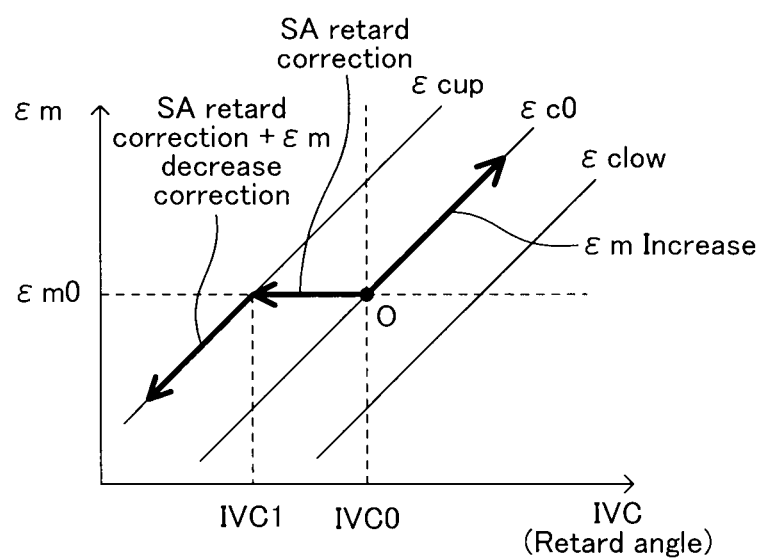
FIG. 15 is a graph illustrating both the changes in the relationship between the intake valve closing timing and the mechanical compression ratio with respect to the increase in the shift amount of the actual timing of the intake valve closing timing from the reference timing of the intake valve closing timing illustrated in FIGS. 7 and 13.

FIG. 15 illustrates the transitions of the (IVCa, $\epsilon ma$) illustrated in FIGS. 7 and 13. Specifically, FIG. 15 illustrates the transition of the (IVCa, $\epsilon ma$), when the present embodiment is applied in case where the IVCa is gradually shifted toward the retard angle side or toward the advance angle side from the IVCt (=IVC0).

Figure 16:
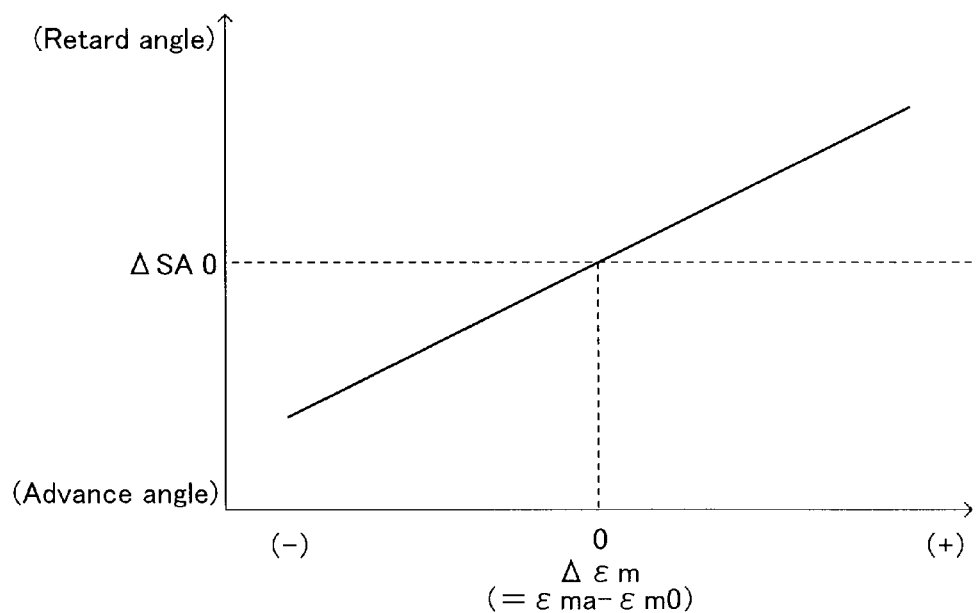
FIG. 16 is a graph illustrating a relationship between the shift amount of the actual value of the mechanical compression ratio from the reference value of the mechanical compression ratio and the ignition timing correction amount, when the ignition timing correction is executed by the control apparatus illustrated in FIG. 1.

FIG. 16 illustrates the relationship between the shift amount $\Delta \epsilon m$ of the $\epsilon ma$ (=$\epsilon ma - \epsilon m0$) and the correction amount (amount of retard angle or amount of advance angle) of the SA from the SAt, in case where the SA correction is executed in the present embodiment when the $\epsilon ma$ is shifted from the $\epsilon m0$ to fall within the range of $\epsilon m1$ to $\epsilon m2$ (see FIG. 14).

Figure 17:
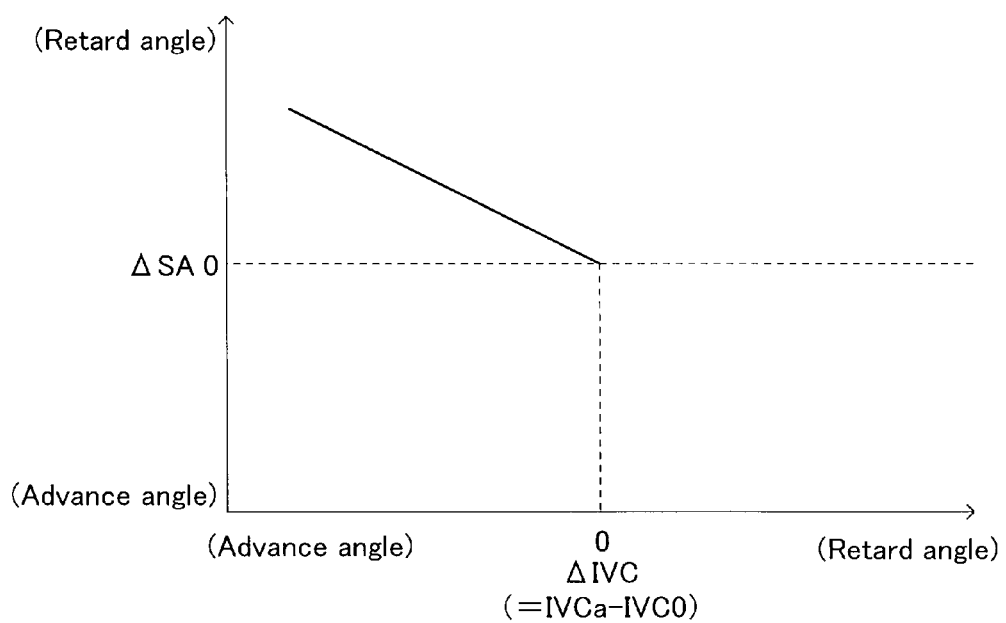
FIG. 17 is a graph illustrating a relationship between the shift amount of the actual timing of the intake valve closing timing from the reference timing of the intake valve closing timing and the ignition timing correction amount, when the ignition timing correction is executed by the control apparatus illustrated in FIG. 1.

FIG. 17 illustrates the relationship between the shift amount $\Delta IVC$ of the IVCa (=IVCa-IVC0) and the correction amount (amount of retard angle or amount of advance angle) of the SA from the SAt, in case where the SA correction is executed in the present embodiment when the IVCa is shifted from the IVC0 to fall within the range of IVC1 to IVC0 (see FIG. 15).

<Process Flow Involved with Control of Intake Valve Closing Timing, Mechanical Compression Ratio, and Ignition Timing>

Figure 18:
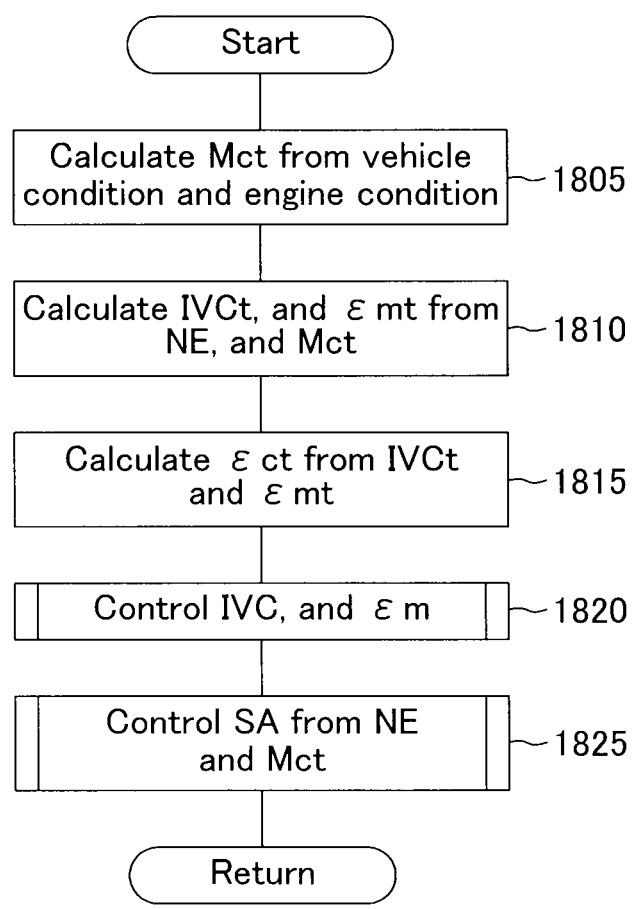
FIG. 18 is a flowchart illustrating a process flow when a normal control for the mechanical compression ratio, the intake valve closing timing, and the ignition timing is executed by the control apparatus illustrated in FIG. 1.

Next, a flow of processes involved with the control of the IVC, $\epsilon m$, and SA will be described with reference to FIGS. 18 and 19. Firstly, the process flow in a "normal case" in which the IVC correction, the $\epsilon m$ correction, and the SA correction are not executed will be described with reference to FIG. 18.

In step 1805, a requested cylinder intake air quantity Mct, which is the cylinder intake air quantity requested by a driver, is calculated from the vehicle condition such as the accelerator operation amount Accp, and the engine revolution NE. Then, in step 1810, the current IVCt and the current $\epsilon mt$ are calculated from the combination of the engine revolution NE and the Mct according to the method described above.

Next, in step 1815, the $\epsilon ct$ is calculated from the current IVCt and the current $\epsilon mt$. In step 1820, the variable intake valve timing apparatus 125 undergoes a feedback control in order that the IVCa agrees with the IVCt, and the variable compression ratio mechanism 14 undergoes a feedback control in order that the $\epsilon ma$ agrees with the $\epsilon mt$.

In step 1825, the current SAt is calculated from the combination of the engine revolution NE and the Mct according to the method described above, and the SA is controlled to be the SAt. From the above process, the control pattern corresponding to the ultra high expansion cycle can be realized.

Subsequently, the process flow in the case in which the IVC correction, the $\epsilon m$ correction, and the SA correction are executed will be described with reference to FIG. 19. The process illustrated in FIG. 19 is executed according to the execution of the process in FIG. 18.

In step 1905, the current IVCa and the $\epsilon ma$ are firstly detected. Then, in step 1910, the $\epsilon ca$ is calculated from the current IVCa and the current $\epsilon ma$. In step 1915, it is determined whether the $\epsilon ca$ (calculated in step 1910) is deviated (shifted) from the $\epsilon ct$ (calculated in step 1815 in FIG. 18) or not. Here, when the $\epsilon ca$ is deviated from the $\epsilon ct$ by an amount not less than a predetermined very small amount, the "Yes" determination is made.

When "No" determination is made in step 1915, the process is ended. Specifically, in this case, the $\epsilon ca$ is not shifted from the $\epsilon ct$, so that the IVC correction, $\epsilon m$ correction, and SA correction are not executed. In other words, the SA is controlled to be the SAt in order that the IVCa agrees with the IVCt and the $\epsilon ma$ agrees with the $\epsilon mt$.

On the other hand, when the "Yes" determination is made in step 1915 (i.e., when the $\epsilon ca$ is shifted from the $\epsilon ct$), the process is continued as described below. In step 1920, the $\epsilon cup$ and the $\epsilon clow$ are calculated from the current $\epsilon ma$. Then, in step 1925, it is determined whether the $\epsilon ma$ is shifted toward the greater side from the $\epsilon mt$ or not.

The case in which the "Yes" determination is made in step 1925 will firstly be described. In this case, it is determined in step 1930 whether the $\epsilon ca$ falls within the range of $\epsilon cup$ to $\epsilon clow$ or not. When the "Yes" determination is made, only the SA retard correction is executed in step 1935. This case corresponds to the case in which the $\epsilon ma$ falls within the range of $\epsilon m0$ to $\epsilon m1$ in FIG. 4.

On the other hand, when the "No" determination is made in step 1930, the SA retard correction+IVC retard correction are executed in step 1940. This case corresponds to the case in which the $\epsilon ma$ is greater than the $\epsilon m1$ in FIG. 4.

Next, the case in which the "No" determination is made in step 1925 will be described. In this case, it is determined in step 1945 whether the IVCa is shifted to the advance angle side from the IVCt or not.

The case where the "Yes" determination is made in step 1945 will firstly be described. In this case, it is determined in step 1950 whether the $\epsilon ca$ falls within the range of $\epsilon cup$ to $\epsilon clow$ or not. When the "Yes" determination is made, only the SA retard correction is executed in step 1955. This case corresponds to the case in which the IVCa falls within the range of IVC0 to IVC1 in FIG. 7.

On the other hand, when the "No" determination is made in step 1950, the SA retard correction+$\epsilon m$ decrease correction are executed in step 1960. This case corresponds to the case in which the IVCa is at the advance angle side from the IVC1 in FIG. 7.

Next, the case in which the "No" determination is made in step 1945 will be described. In this case, it is determined in step 1965 whether the $\epsilon ma$ is shifted to be smaller than the $\epsilon mt$ or not.

The case where the "Yes" determination is made in step 1965 will firstly be described. In this case, it is determined in step 1970 whether the $\epsilon ca$ falls within the range of $\epsilon cup$ to εclow or not. When the "Yes" determination is made, only the SA advance correction is executed in step 1975. This case corresponds to the case in which the εma falls within the range of εm0 to εm2 in FIG. 10.

On the other hand, when the "No" determination is made in step 1970, the SA advance correction+IVC advance correction are executed in step 1980, and the TA decrease correction is executed in step 1985. This case corresponds to the case in which the εma is smaller than the εm2 in FIG. 10.

Next, the case in which the "No" determination is made in step 1965 will be described. This case corresponds to the case where it is determined that the IVCa is shifted to the retard angle side from the IVCt. In this case, only the εm increase correction is executed in step 1990. This case corresponds to the case in which the IVCa is at the retard angle side from the IVC0 in FIG. 13.

Figure 19:
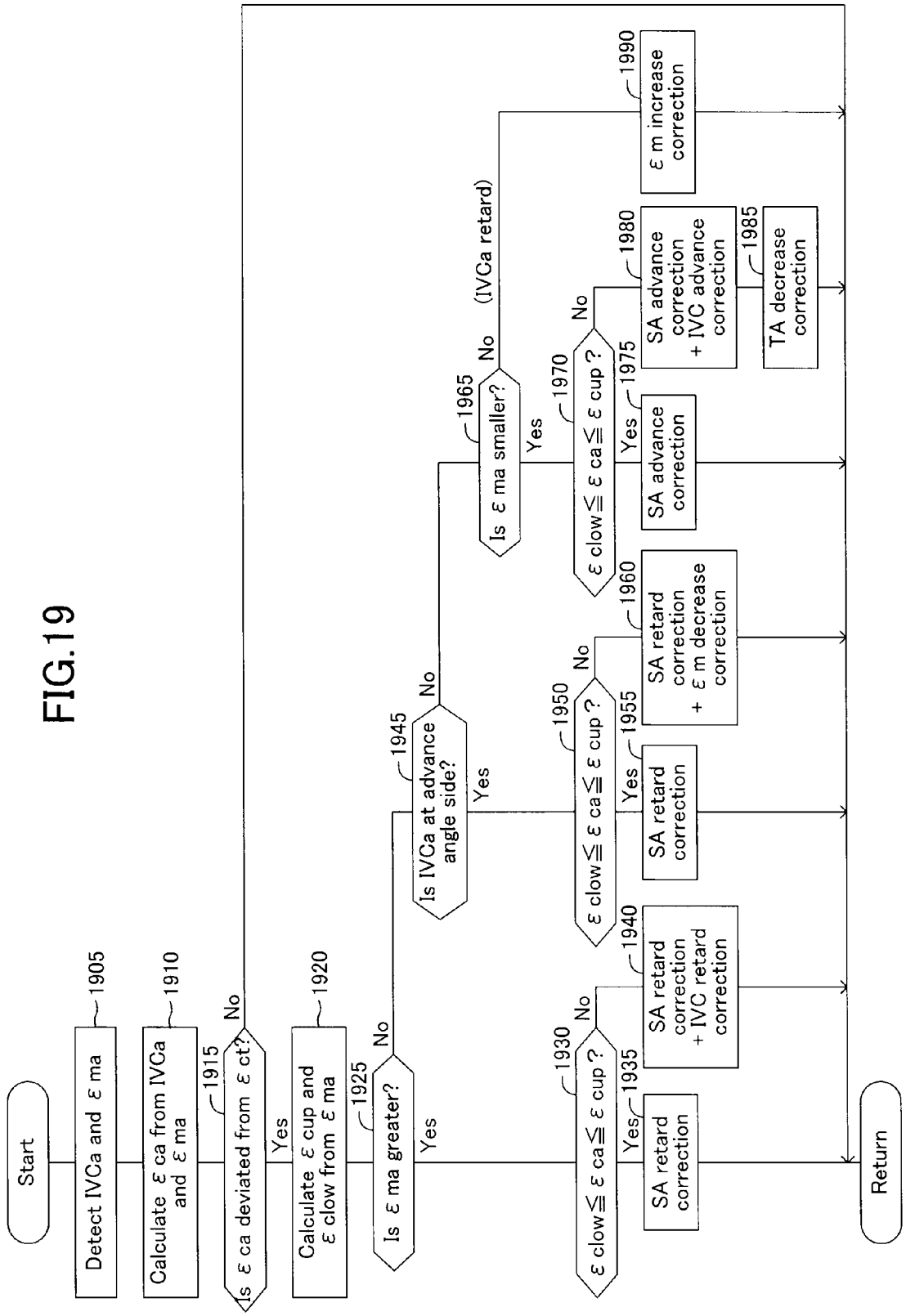
FIG. 19 is a flowchart illustrating a process flow when various corrections are executed by the control apparatus illustrated in FIG. 1.

The correction process such as the IVC correction, the εm correction and the SA correction started by the process illustrated in FIG. 19 is continued until the "shift of the εma from the εmt" or the "shift of the IVCa from the IVCt", which causes the "Yes" determination in step 1915, is eliminated.

As described above, according to the control apparatus of the internal combustion engine according to the first embodiment described above, the control pattern corresponding to the ultra high expansion cycle is executed so as to allow the IVCa to agree with the IVCt, to allow the εma to agree with the εmt, and to allow the SA to agree with the SAt. There are four cases that might be generated, which are the case where the IVCa is shifted toward the retard angle side or toward the advance angle side from the IVCt due to the response delay of the variable intake valve timing apparatus 125, and the case where the εma is shifted to be greater than or to be smaller than the εmt due to the response delay of the variable compression ratio mechanism 14. With respect to each of the foregoing four cases, there are two countermeasures that are the "countermeasure of executing the IVC correction or the εm correction in order to return the εca to the εct" and the "countermeasure of executing the SA correction with the shift of the εca from the εct being kept". In the first embodiment, one of two countermeasures is selected for each of the foregoing four cases, from the viewpoint of selecting "a pattern having the best fuel efficiency, in the case in which to secure an output torque required by a driver takes first priority".

Figure 20:
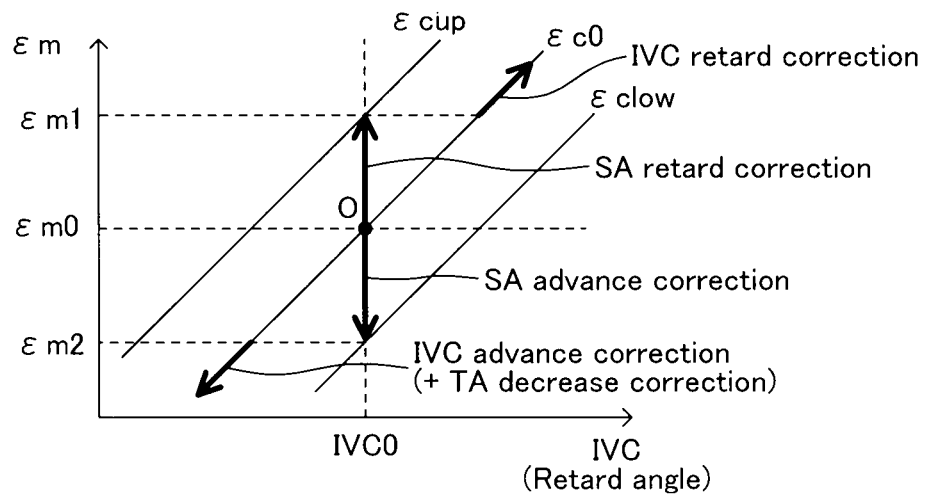
FIG. 20 is a graph, corresponding to FIG. 14, when the control apparatus of the internal combustion engine according to a modification of the first embodiment of the present invention is applied.

The present invention is not limited to the first embodiment, and various modifications are possible without departing from the scope of the present invention. For example, in the first embodiment, when the εma is without the range of the εm2 to εm1 (i.e., when the εca is outside the range of the εclow to εcup) in case where the εma shifted from the εmt (=εm0), the IVC correction is executed in addition to the SA correction so as to control the εca to agree with the εclow or the εcup, as illustrated in FIG. 14. On the other hand, when the εma is outside the range of the εm2 to εm1 (i.e., when the εca is outside the range of the εclow to the εcup), the IVC correction may be executed without the execution of the SA correction so as to control the εca to agree with the εct (=εc0), as illustrated in FIG. 20.

Figure 21:
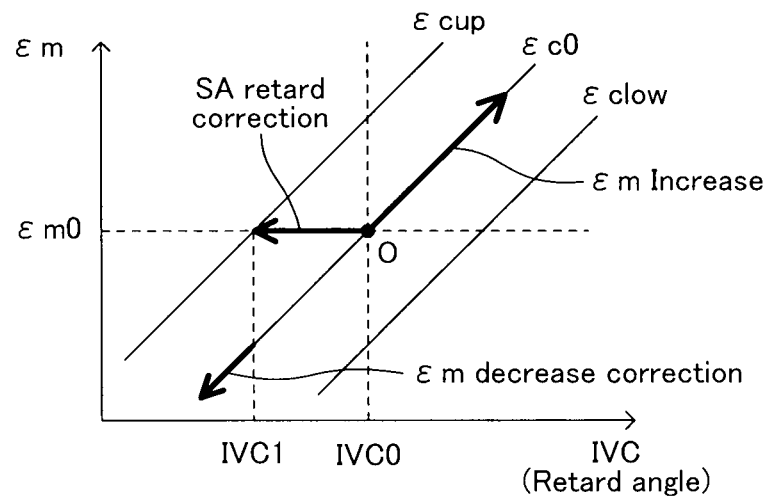
FIG. 21 is a graph, corresponding to FIG. 15, when the control apparatus of the internal combustion engine according to the modification of the first embodiment of the present invention is applied.

In the present invention, as illustrated in FIG. 15, when the IVCa is at the side of the advance angle side (i.e., when the εca is greater than the εcup) in case where the IVCa is shifted toward the advance angle side from the IVCt (=IVC0), the εm decrease correction is executed in addition to the SA retard correction so as to control the εca to agree with the εcup. On the other hand, as illustrated in FIG. 21, when the IVCa is at the side of the advance angle side (i.e., when the εca is greater than the εcup) in case where the IVCa is shifted toward the advance angle side from the IVC1, the εm decrease correction may be executed without the execution of the SA correction so as to control the εca to agree with the εct (=εc0).

Second Embodiment

A second embodiment of a control apparatus of an internal combustion engine according to the present invention will next be described with reference to the drawings. The second embodiment is applied to a vehicle having a motor 3 indicated by a broken line in FIG. 1 mounted thereto, i.e., to a so-called hybrid vehicle having the internal combustion engine 1 and the motor 3 serving as an output source of the vehicle. When the output torque of the internal combustion engine 1 is reduced due to the shift of the IVCa toward the retard angle side in case where the above-mentioned ultra high expansion cycle is executed, the output torque of the motor 3 is increased, whereby the reduction in the output torque of the internal combustion engine 1 can be compensated. The control of compensating the reduction in the output torque of the internal combustion engine 1 by increasing the output torque of the motor 3 is referred to as a "torque increase correction".

The second embodiment is different from the first embodiment, which is not applied to the hybrid vehicle, and which selects "a pattern having the best fuel efficiency, in the case in which to secure an output torque required by a driver takes first priority", in that the second embodiment is applied to the hybrid vehicle as described above, and one of the two countermeasures is selected for each of the foregoing "four cases" from the viewpoint of selecting "a pattern in which suppression of deterioration in fuel efficiency takes first priority". The different points will only be described below.

Which one of the countermeasures is employed for each of the foregoing "four cases" in the second embodiment will sequentially be described below.

<Case in which εma is Shifted to be Greater than εmt (IVCa Agrees with IVCt)>

Figure 22:
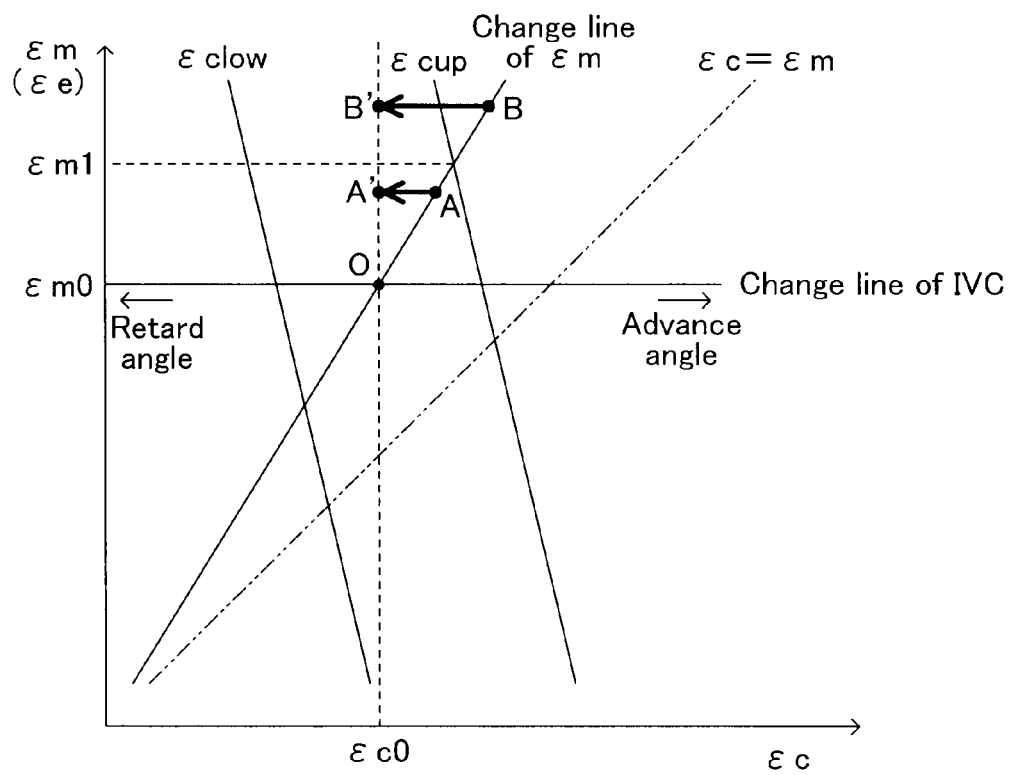
FIG. 22 is a graph, corresponding to FIG. 2, illustrating the change in the relationship between the actual compression ratio and the mechanical compression ratio, when the intake valve closing timing retard correction is executed in case where the actual value of the mechanical compression ratio is shifted to the greater side from the reference value of the mechanical compression ratio.
Figure 23:
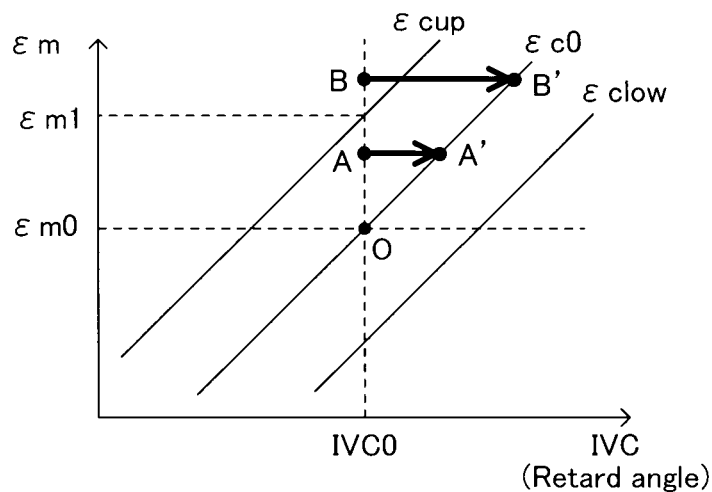
FIG. 23 is a graph, corresponding to FIG. 22, illustrating a change in the relationship between the intake valve closing timing and the mechanical compression ratio.
Figure 24:
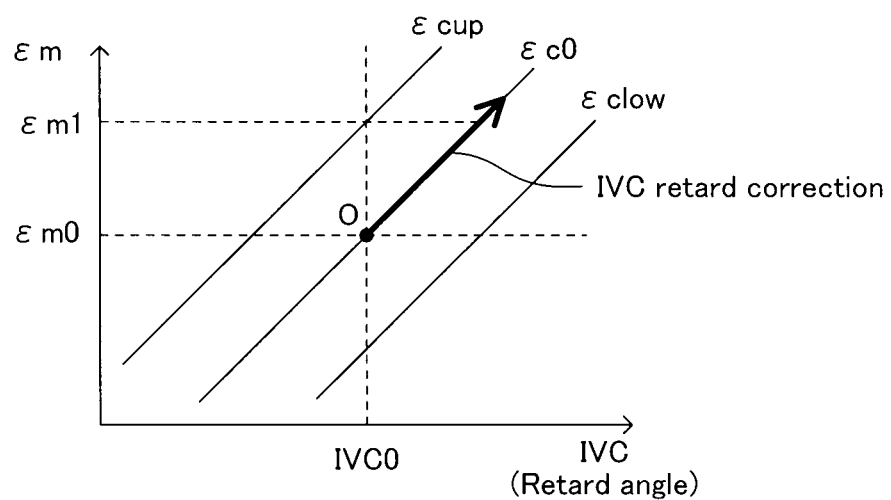
FIG. 24 is a graph illustrating a change in the relationship between the intake valve closing timing and the mechanical compression ratio, with respect to the increase in the shift amount of the actual value of the mechanical compression ratio from the reference value of the mechanical compression ratio, when various corrections are executed by a control apparatus of an internal combustion engine according to a second embodiment of the present invention in case where the actual value of the mechanical compression ratio is shifted to the greater side from the reference value of the mechanical compression ratio.

FIGS. 22 to 24 respectively correspond to FIGS. 2 to 4. Therefore, the detailed description thereof will be skipped. The case where the (εca, εma) is shifted from the point O to the point A in FIG. 22 (i.e., where the (IVCa, εma) is shifted from the point O to the point A in FIG. 23) will firstly be described below. As described above, the εca becomes greater than the εct. Therefore, in order to prevent the occurrence of the knocking, the IVC retard correction or the SA retard correction is selected. When the IVC retard correction is executed to return the εca to the εct (=εc0), the (εca, εma) is moved from the point A to the point A' in FIG. 22, while the (IVCa, εma) is moved from the point A to the point A' in FIG. 23. On the other hand, when the SA retard correction is executed, the εca and the εma are kept to be constant. Therefore, the (εca, εma) is kept to be on the point A in FIG. 22, while the (IVCa, εma) is kept to be on the point A in FIG. 23.

When the εma is shifted to be greater than the εmt, the expansion ratio is great due to the shift of the εm toward the greater side, so that the fuel efficiency is in a satisfactory state. When the SA retard correction is executed, the fuel efficiency is liable to deteriorate. On the other hand, even when the IVC retard correction is executed, the fuel efficiency can be maintained. From the above, in the second embodiment, the IVC retard correction is selected and executed, when the εca is not more than the εcup. Specifically, the (εca, εma) is moved from the point A to the point A' in FIG. 22, while the (IVCa, εma) is moved from the point A to the point A' in FIG. 23. Thus, the εca is returned to be the εct (=εc0). The amount of retard angle in the IVC retard correction is calculated from the εma and the εct (=εc0), and it assumes a greater value, as the shift amount of the εca toward the greater side from the εc0 becomes great.

The case where the ($\epsilon$ca, $\epsilon$ma) is shifted from the point O to the point B in FIG. 22 (i.e., where the (IVCa, $\epsilon$ma) is shifted from the point O to the point B in FIG. 23) will next be described below. In this case (i.e., even when the $\epsilon$ca exceeds the $\epsilon$cup), the IVC retard correction is selected and executed by the same reason as the case in which the ($\epsilon$ca, $\epsilon$ma) is shifted from the point O to the point A in FIG. 22. Specifically, the ($\epsilon$ca, $\epsilon$ma) is moved from the point B to the point B' in FIG. 22, while the (IVCa, $\epsilon$ma) is shifted from the point B to the point B' in FIG. 23. Thus, the $\epsilon$ca is returned to be the $\epsilon$ct (=$\epsilon$c0). The amount of retard angle in the IVC retard correction is calculated from the $\epsilon$ma and the $\epsilon$ct (=$\epsilon$c0), and it assumes a greater value, as the shift amount of the $\epsilon$ca toward the greater side from the $\epsilon$c0 becomes great.

FIG. 24 illustrates the transition of the (IVCa, $\epsilon$ma) in case where the $\epsilon$ma is gradually shifted to the greater side from the $\epsilon$mt (=$\epsilon$m0). In this case, regardless of which one of the $\epsilon$ma and the $\epsilon$m1 is greater, only the IVC retard correction is executed during the process in which the $\epsilon$ma is increased from the $\epsilon$m0. Therefore, the IVCa is retarded from the IVC0 with the $\epsilon$ca being kept to be the $\epsilon$c0, with the increase of the $\epsilon$ma. In this case, the SA correction is not executed, so that the SA is kept to be the SAt.

When the IVC retard correction is executed, the output torque of the internal combustion engine 1 is reduced as described above. In order to compensate the reduction in the output torque of the internal combustion engine 1, the torque increase correction is simultaneously executed with the IVC retard correction.

<Case in which IVCa is Shifted Toward Advance Angle Side from IVCt ($\epsilon$ma Agrees with $\epsilon$mt)>

In this case, the $\epsilon$m decrease correction or the SA retard correction can be selected as described above. When the $\epsilon$m decrease correction is executed, the fuel efficiency is liable to deteriorate as described above. On the contrary, even when the SA retard correction is executed, the fuel efficiency is difficult to deteriorate. From the above, the countermeasure same as the first embodiment (i.e., the countermeasure same as that illustrated in FIG. 7) is selected in this case. In this case, even when either one the $\epsilon$m decrease correction and the SA retard correction is executed, the output torque of the internal combustion engine 1 is difficult to reduce. Accordingly, the torque increase correction is not executed.

<Case in which $\epsilon$ma is Shifted to be Smaller than $\epsilon$mt (IVCa Agrees with IVCt)>

In this case, the IVC advance correction or the SA advance correction can be selected as described above. When the IVC advance correction is executed, the fuel efficiency is liable to deteriorate, since the TA decrease correction is simultaneously executed, as described above. On the contrary, even when the SA advance correction is executed, the fuel efficiency is difficult to deteriorate. From the above, the countermeasure same as the first embodiment (i.e., the countermeasure same as that illustrated in FIG. 10) is selected in this case. In this case, even when either one the IVC advance correction and the SA advance correction is executed, the output torque of the internal combustion engine 1 is difficult to reduce. Accordingly, the torque increase correction is not executed.

<Case in which IVCa is Shifted Toward Retard Angle Side from IVCt ($\epsilon$ma Agrees with $\epsilon$mt)>

In this case, the $\epsilon$m increase correction or the SA advance correction can be selected as described above. When the SA advance correction is executed, the fuel efficiency is difficult to improve as described above. On the contrary, even when the $\epsilon$m increase correction is executed, the expansion ratio directly increases to enhance the thermal efficiency, whereby the fuel efficiency is easy to be enhanced. From the above, the countermeasure same as the first embodiment (i.e., the countermeasure same as that illustrated in FIG. 13) is selected in this case. It is to be noted in this case that the output torque of the internal combustion engine 1 is reduced due to the decrease in the cylinder intake air quantity because of the shift of the IVC toward the retard angle side. In order to compensate the reduction in the output torque of the internal combustion engine 1, the torque increase correction is simultaneously executed with the $\epsilon$m increase correction.

The countermeasures for each of the four cases in the second embodiment, which selects "a pattern in which the suppression of the deterioration in the fuel efficiency takes first priority", has been described above. The present embodiment will be summed up below with reference to FIGS. 25 to 28.

Figure 25:
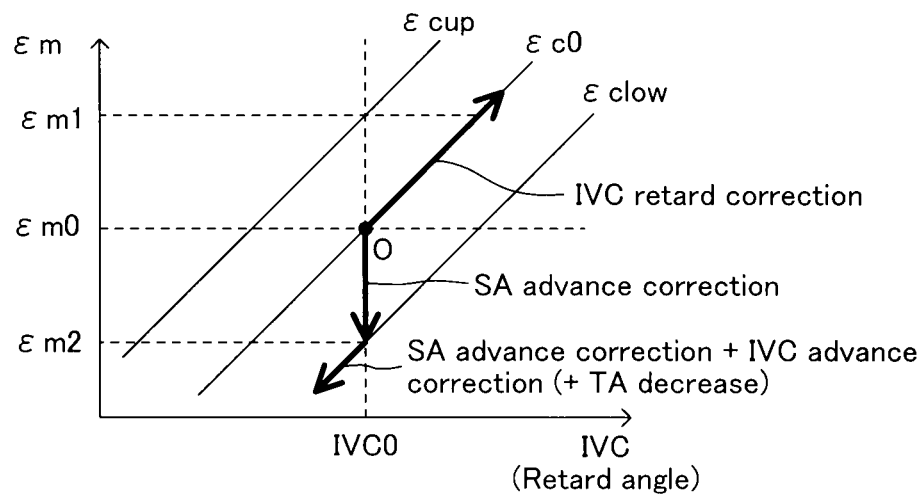
FIG. 25 is a graph, corresponding to FIG. 14, when the control apparatus of the internal combustion engine according to the second embodiment of the present invention is applied.

FIG. 25 corresponds to FIG. 14, and illustrates the transitions of the (IVCa, $\epsilon$ma) illustrated in FIGS. 24 and 10. Specifically, FIG. 25 illustrates the transition of the (IVCa, $\epsilon$ma), when the second embodiment is applied in case where the $\epsilon$ma is gradually shifted toward the greater side or toward the smaller side from the $\epsilon$mt (=$\epsilon$m0).

Figure 26:
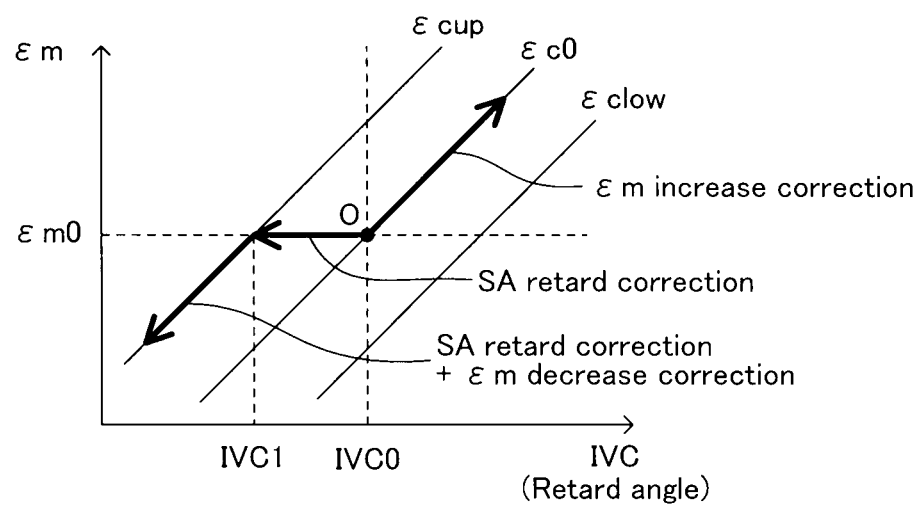
FIG. 26 is a graph, corresponding to FIG. 15, when the control apparatus of the internal combustion engine according to the second embodiment of the present invention is applied.

FIG. 26 corresponds to FIG. 14, and illustrates the transitions of the (IVCa, $\epsilon$ma) illustrated in FIGS. 7 and 13. Specifically, FIG. 26 illustrates the transition of the (IVCa, $\epsilon$ma), when the second embodiment is applied in case where the IVCa is gradually shifted toward the retard angle side or toward the advance angle side from the IVCt (=IVC0). In this case, the transitions of the (IVCa, $\epsilon$ma) in the first and second embodiments are totally the same.

Figure 27:
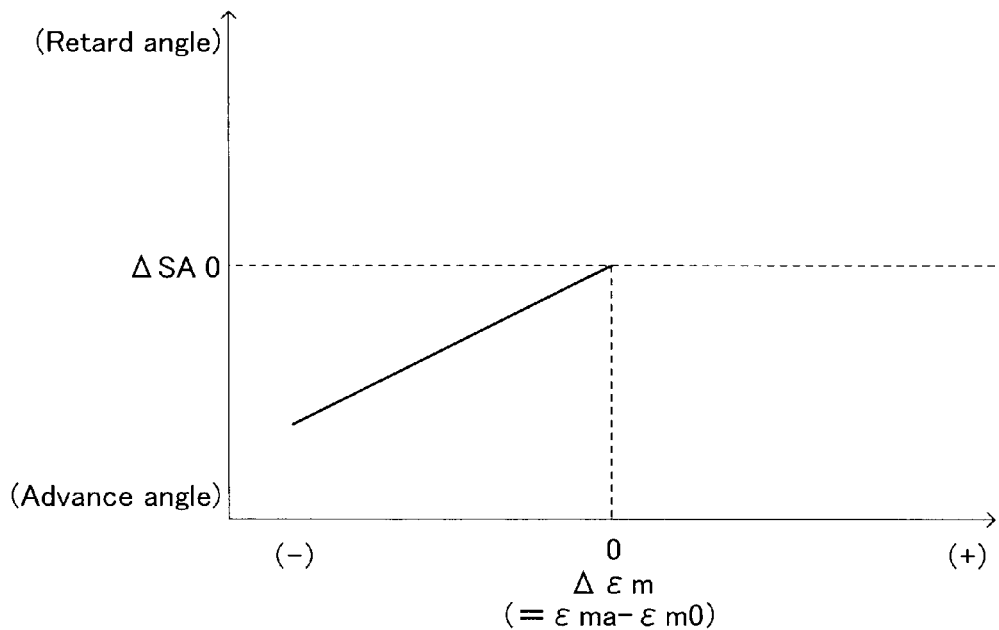
FIG. 27 is a graph illustrating a relationship between the shift amount of the actual value of the mechanical compression ratio from the reference value of the mechanical compression ratio and the ignition timing correction amount, when the ignition timing correction is executed by the control apparatus of an internal combustion engine according to the second embodiment of the present invention.

FIG. 27 illustrates the relationship between the shift amount $\Delta\epsilon$m of the $\epsilon$ma (=$\epsilon$ma−$\epsilon$m0) and the correction amount (only the amount of advance angle) of the SA from the SAt, in case where the SA correction is executed in the second embodiment when the $\epsilon$ma is shifted from the $\epsilon$m0 to fall within the range of $\epsilon$m2 to $\epsilon$m0 (see FIG. 25).

Figure 28:
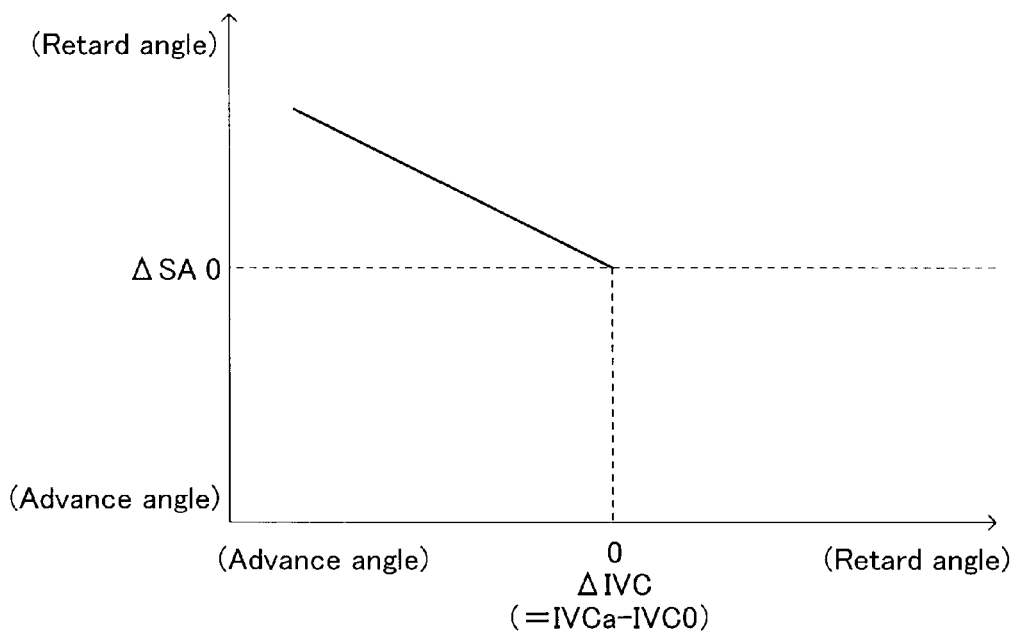
FIG. 28 is a graph illustrating a relationship between the shift amount of the actual timing of the intake valve closing timing from the reference timing of the intake valve closing timing and the ignition timing correction amount, when the ignition timing correction is executed by the control apparatus of an internal combustion engine according to the second embodiment of the present invention.

FIG. 28 illustrates the relationship between the shift amount $\Delta$IVC of the IVCa (=IVCa−IVC0) and the correction amount (only the amount of retard angle) of the SA from the SAt, in case where the SA correction is executed in the second embodiment when the IVCa is shifted from the IVC0 to fall within the range of IVC1 to IVC0 (see FIG. 26).

Figure 29:
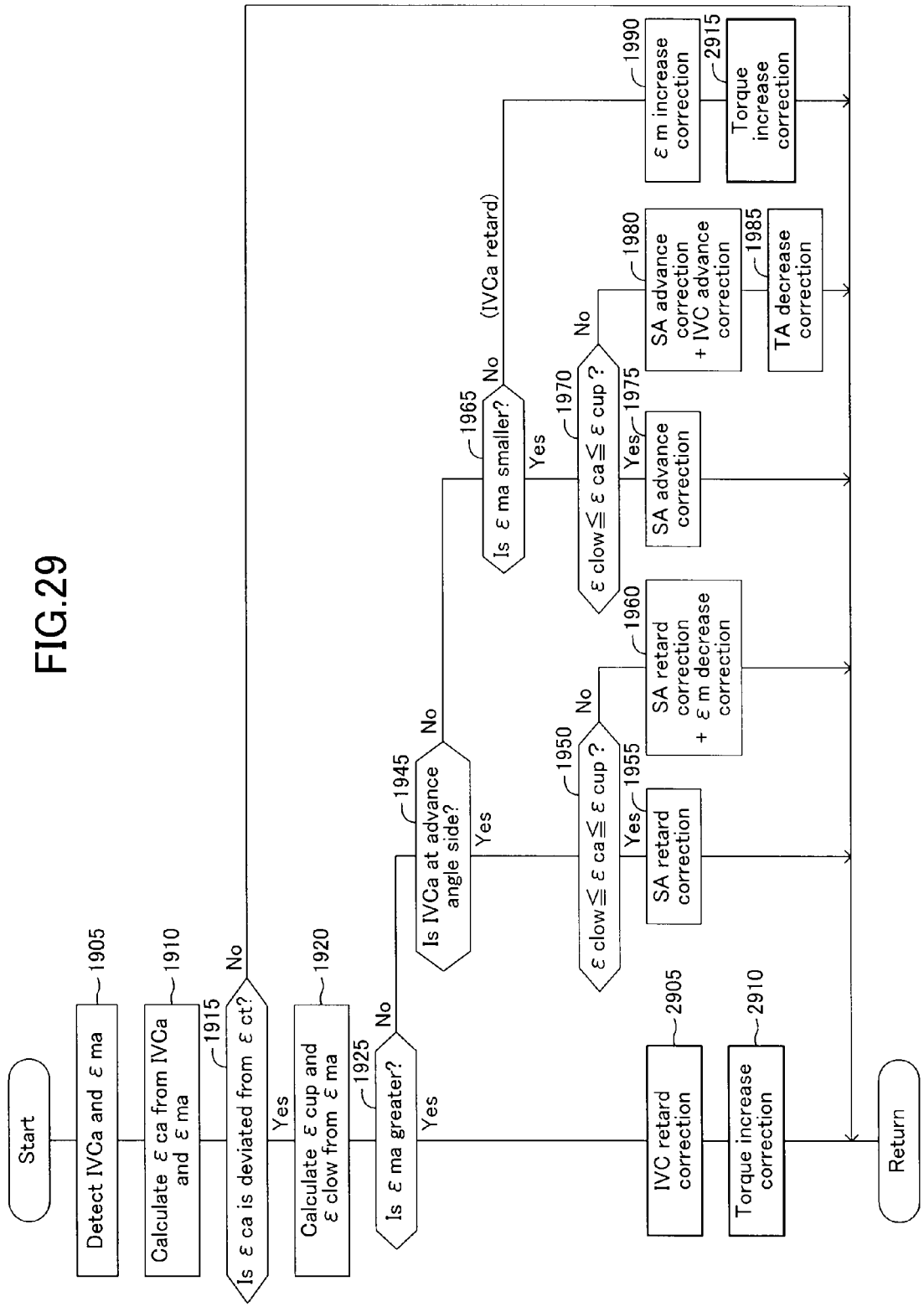
FIG. 29 is a flowchart illustrating a process flow when a normal control for the mechanical compression ratio, the intake valve closing timing, and the ignition timing is executed by the control apparatus of an internal combustion engine according to the second embodiment of the present invention.

FIG. 29 corresponds to FIG. 19, and illustrates the process flow when the IVC correction, the $\epsilon$m correction and the SA correction are executed in the second embodiment. The second embodiment is different from the first embodiment in that, in the second embodiment, steps 2905 and 2910 are provided instead of the steps 1930, 1935, and 1940 in FIG. 19, and step 2915 is provided after the step 1990. The detailed description for the other processes will be skipped here.

Figure 30:
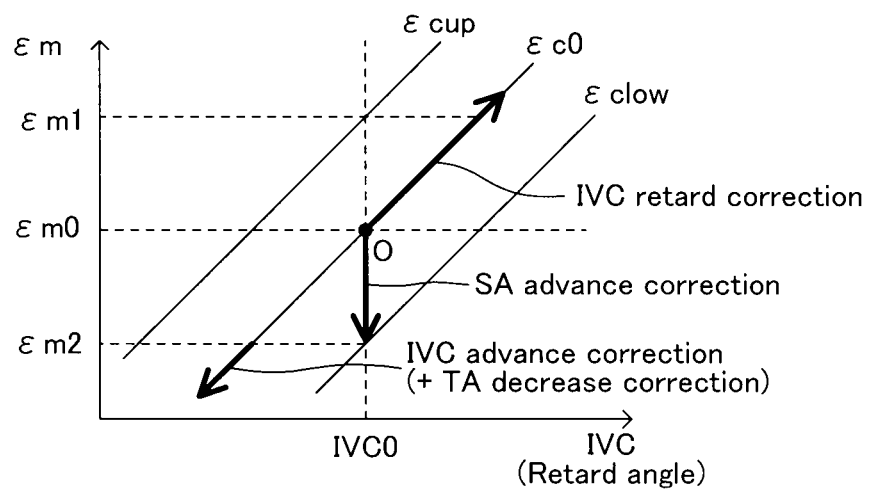
FIG. 30 is a graph, corresponding to FIG. 25, when the control apparatus of the internal combustion engine according to a modification of the second embodiment of the present invention is applied.

The second embodiment has been described above. The present invention is not limited to the second embodiment, and various modifications are possible without departing from the scope of the present invention. For example, in the second embodiment, when the $\epsilon$ma is smaller than the $\epsilon$m2 (i.e., when the $\epsilon$ca is smaller the $\epsilon$clow) in case where the $\epsilon$ma is shifted to be smaller than the $\epsilon$mt (=$\epsilon$m0), the IVC advance correction is executed in addition to the SA advance correction so as to control the $\epsilon$ca to agree with the $\epsilon$clow, as illustrated in FIG. 25. On the other hand, when the $\epsilon$ma is smaller than the $\epsilon$m2 (i.e., when the $\epsilon$ca is smaller than the $\epsilon$clow), the IVC advance correction may be executed without the execution of the SA advance correction so as to control the $\epsilon$ca to agrees with the $\epsilon$ct (=$\epsilon$c0), as illustrated in FIG. 30.

Figure 31:
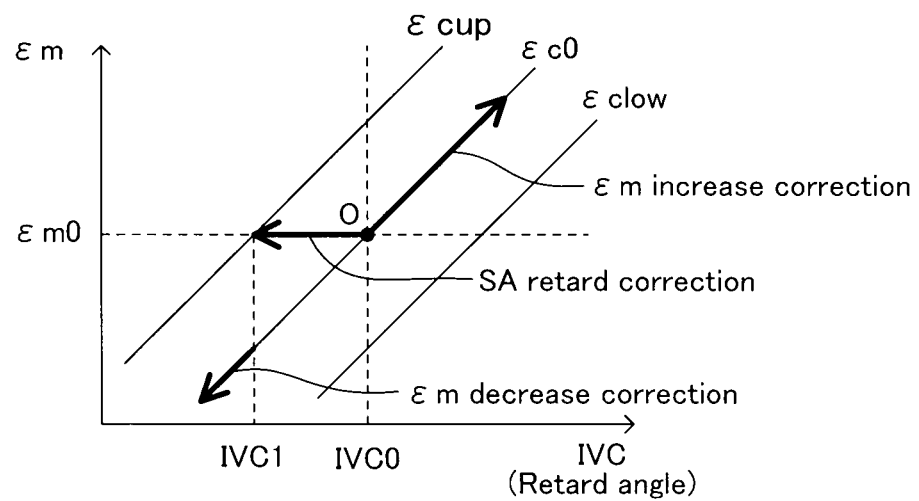
FIG. 31 is a graph, corresponding to FIG. 26, when the control apparatus of the internal combustion engine according to the modification of the second embodiment of the present invention is applied.

In the second invention, as illustrated in FIG. 26, when the IVCa is at the side of the advance angle side (i.e., when the $\epsilon$ca is greater than the $\epsilon$cup) in case where the IVCa is shifted toward the advance angle side from the IVCt (=IVC0), the $\epsilon$m decrease correction is executed in addition to the SA retard correction so as to control the εca to agree with the εcup. On the other hand, as illustrated in FIG. 31, when the IVCa is at the side of the advance angle side (i.e., when the εca is greater than the εcup) in case where the IVCa is shifted toward the advance angle side from the IVC1, the εm decrease correction may be executed without the execution of the SA correction so as to control the εca to agrees with the εct (=εc0).

In the second embodiment, when the output torque of the internal combustion engine 1 is reduced due to the shift of the IVCa toward the retard angle side, the output torque of the motor 3 is increased to attain the torque increase correction. On the other hand, when the output torque of the internal combustion engine 1 is reduced due to the shift of the IVCa toward the retard angle side, the speed reducing ratio of the transmission (particularly, a continuous variable transmission) mounted to a vehicle having the internal combustion engine 1 mounted thereto may be increased, and the engine revolution of the internal combustion engine 1 may be increased, in order to attain the torque increase correction.

In the first and second embodiments, when the SA correction is executed, the SA is determined to be the timing corrected from the SAt, which is decided from a combination of Mct and NE by a map search, by a correction amount ΔSA that is decided from the Δεm or ΔIVC (see FIGS. 16, 17, 27, and 28) by a map search. On the other hand, when the SA correction is executed, the SA may be determined to be the timing decided by one map search from Mct, NE, Δεm and ΔIVC.

In the first and second embodiments, the ultra high expansion cycle is employed, wherein the IVC is set to be the retard angle side from the intake bottom dead center. On the other hand, the IVC may be set to the timing (i.e., at the advance angle side from the intake bottom dead center) that is symmetric with respect to the intake bottom dead center. In this case, the "IVC retard angle" is replaced with the "IVC advance angle", and the "IVC advance angle" is replaced with the "IVC retard angle" in the first and second embodiments, whereby the operation and effect totally same as those in the first and the second embodiments can be achieved.

In the first and second embodiments, the εcup and the εclow are respectively set to be the upper limit value and the lower limit value by which the appropriate combustion state can be continued even if the SA correction is executed. On the other hand, the εcup and the εclow may be set in such a manner that the output torque of the internal combustion engine 1 is more increased, or the fuel efficiency (thermal efficiency) is more enhanced, in case where "the SA correction is executed with the shift of the εca from the εct being kept" than in the case where "the IVC correction or the εm correction is executed in order to return the εca to the εct", so long as the εca falls within the range of the εclow to the εcup.

In the first and second embodiments, it is determined in step 1915 in FIG. 19 whether the IVC correction, the εm correction, and the SA correction are needed or not by the determination as to whether the "εca is deviated from the εct or not". On the other hand, it may be determined whether the IVC correction, the εm correction, and the SA correction are needed or not by the determination as to whether "the IVCa is deviated from the IVCt or not, or the εma is deviated from the εmt or not".

The subject to which the present invention is applied is not limited to a vehicle. The present invention is applicable to a gasoline engine, diesel engine, methanol engine, bioethanol engine, and engines of the other optional types. The number of the cylinders, the cylinder arranging system (serial-type, V-type, horizontal opposed type), and the fuel injecting system (port injection, direct injection) are not particularly limited.

Further, the configuration of the internal combustion engine 1 including the variable compression ratio mechanism 14 is not limited to the one in the above-mentioned embodiments. For example, the present invention is satisfactorily applied, when the internal combustion engine 1 is configured such that a connection rod 132 has a multi-link structure, and the mechanical compression ratio is changed by changing the bending state of the connection rod 132 (see Japanese Unexamined Patent Application No. 2004-156541).

What is claimed is:

1. A control apparatus of an internal combustion engine including a valve closing timing adjusting mechanism that adjusts a closing timing of an intake valve of the internal combustion engine, a mechanical compression ratio adjusting mechanism that adjusts a mechanical compression ratio of the internal combustion engine, and an ignition mechanism that ignites an air-fuel mixture in a combustion chamber of the internal combustion engine, the control apparatus comprising:

a reference state determining unit that, according to an operation state of the internal combustion engine, determines a reference timing of the intake valve closing timing to be within a region where the timing is retarded toward a retard angle side from an intake bottom dead center by 90° crank angle or more or to be within a region where the timing is advanced toward an advance angle side from the intake bottom dead center by 90° crank angle or more, determines a reference value of the mechanical compression ratio to be within a region of 20 or more, and determines a reference timing of the ignition timing for igniting the air-fuel mixture to be within a region around a region immediately before an intake top dead center; and a control unit that respectively controls the valve closing timing adjusting mechanism and the mechanical compression ratio adjusting mechanism which allows an actual timing of the closing timing of the intake valve to agree with the reference timing of the closing timing, and which allows an actual value of the mechanical compression ratio to agree with the reference value of the mechanical compression ratio, in order to adjust a cylinder intake air quantity that is a quantity of intake air into the combustion chamber at the closing timing of the intake valve with adjusting an actual compression ratio of the internal combustion engine, and also controls the ignition mechanism which allows the ignition timing to agree with the reference timing of the ignition timing, wherein the control unit controls, in a transient operation state, when the actual value of the actual compression ratio obtained from the actual timing of the closing timing of the intake valve and the actual value of the mechanical compression ratio is shifted from the reference value of the actual compression ratio obtained by the reference timing of the closing timing of the intake valve and the reference value of the mechanical compression ratio, and the actual value of the actual compression ratio falls within a range between a predetermined lower limit value and a predetermined upper limit value, the ignition timing to be a timing different from the reference timing of the ignition timing, not to be the reference timing of the ignition timing, wherein the control unit controls, in a transient operation state, when the actual value of the mechanical compression ratio is greater than the reference value of the mechanical compression ratio, the ignition timing to be a timing at a retard angle side from the reference timing of the ignition timing in case where the actual value of the actual compression ratio is not more than the predetermined upper limit value, while the ignition timing is controlled to be a timing at a retard angle side from the reference timing of the ignition timing, or to be the reference timing of the ignition timing, and the actual timing of the closing timing of the intake valve is controlled to be a timing closer to a top dead center from the reference timing of the closing timing, in case where the actual value of the actual compression ratio is greater than the predetermined upper limit value, in order to control the actual value of the actual compression ratio to be not more than the predetermined upper limit value.

2. A control apparatus of an internal combustion engine according to claim 1, wherein
the control unit controls, in a transient operation state, when the actual timing of the closing timing of the intake valve is at a side closer to a bottom dead center from the reference timing of the closing timing, the ignition timing to be the timing at the retard angle side from the reference timing of the ignition timing in case where the actual value of the actual compression ratio is not more than the predetermined upper limit value, while the ignition timing is controlled to be the timing at the retard angle side from the reference timing of the ignition timing or to be the reference timing of the ignition timing, and the actual value of the mechanical compression ratio is controlled to be a value smaller than the reference value of the mechanical compression ratio in case where the actual value of the actual compression ratio is greater than the predetermined upper limit value, in order to control the actual value of the actual compression ratio to be not more than the predetermined upper limit value.

3. A control apparatus of an internal combustion engine according to claim 1, wherein the control unit controls, in a transient operation state, when the actual value of the mechanical compression ratio is smaller than the reference value of the mechanical compression ratio, the ignition timing to be a timing at an advance angle side from the reference timing of the ignition timing in case where the actual value of the actual compression ratio is not less than the predetermined lower limit value, while the ignition timing is controlled to be the timing at the advance angle side from the reference timing of the ignition timing or to be the reference timing of the ignition timing, and the actual timing of the closing timing of the intake valve is controlled to be a timing closer to the bottom dead center from the reference timing of the closing timing in case where the actual value of the actual compression ratio is smaller than the predetermined lower limit value, in order to control the actual value of the actual compression ratio to be not less than the predetermined lower limit value.

4. A control apparatus of an internal combustion engine according to claim 1, wherein
the control unit controls, in a transient operation state, when the actual timing of the closing timing of the intake valve is at a side closer to a top dead center from the reference timing of the closing timing, the actual value of the mechanical compression ratio to become a value greater than the reference value of the mechanical compression ratio in order to control the actual value of the actual compression ratio to be the reference value of the actual compression ratio, regardless of whether or not the actual value of the actual compression ratio is the predetermined lower limit value or more.

5. A control apparatus of an internal combustion engine according to claim 1, wherein
the control unit is configured to simultaneously control the valve closing timing adjusting mechanism and the mechanical compression ratio adjusting mechanism to allow the actual timing of the closing timing of the intake valve to agree with the reference timing of the closing timing, and to allow the actual value of the mechanical compression ratio to agree with the reference value of the mechanical compression ratio, wherein the actual value of the actual compression ratio is shifted from the reference value of the actual compression ratio due to a difference between response delays of the valve closing timing adjusting mechanism and the mechanical compression ratio adjusting mechanism.

6. A control apparatus of an internal combustion engine including a valve closing timing adjusting mechanism that adjusts a closing timing of an intake valve of the internal combustion engine, a mechanical compression ratio adjusting mechanism that adjusts a mechanical compression ratio of the internal combustion engine, and an ignition mechanism that ignites an air-fuel mixture in a combustion chamber of the internal combustion engine, the control apparatus comprising:
a reference state determining unit that, according to an operation state of the internal combustion engine, determines a reference timing of the intake valve closing timing to be within a region where the timing is retarded toward a retard angle side from an intake bottom dead center by 90° crank angle or more or to be within a region where the timing is advanced toward an advance angle side from the intake bottom dead center by 90° crank angle or more, determines a reference value of the mechanical compression ratio to be within a region of 20 or more, and determines a reference timing of the ignition timing for igniting the air-fuel mixture to be within a region around a region immediately before an intake top dead center; and
a control unit that respectively controls the valve closing timing adjusting mechanism and the mechanical compression ratio adjusting mechanism to allow an actual timing of the closing timing of the intake valve to agree with the reference timing of the closing timing, and to allow an actual value of the mechanical compression ratio to agree with the reference value of the mechanical compression ratio, in order to adjust a cylinder intake air quantity that is a quantity of intake air into the combustion chamber at the closing timing of the intake valve with adjusting an actual compression ratio of the internal combustion engine, and also controls the ignition mechanism to allow the ignition timing to agree with the reference timing of the ignition timing, wherein
the control unit controls, in a transient operation state, when the actual value of the actual compression ratio obtained from the actual timing of the closing timing of the intake valve and the actual value of the mechanical compression ratio is shifted from the reference value of the actual compression ratio obtained by the reference timing of the closing timing of the intake valve and the reference value of the mechanical compression ratio, and the actual value of the actual compression ratio falls within a range between a predetermined lower limit value and a predetermined upper limit value, the ignition timing to be a timing different from the reference timing of the ignition timing, not to be the reference timing of the ignition timing, the control apparatus further comprising an output compensating unit that compensates a reduction in an output of the internal combustion engine caused by a shift of the actual timing of the closing timing of the intake valve toward the side closer to the top dead center from the reference timing of the closing timing, wherein the control unit controls, in a transient operation state, when the actual value of the mechanical compression ratio is greater than the reference value of the mechanical compression ratio, the actual timing of the closing timing of the intake valve to be a timing closer to the top dead center from the reference timing of the closing timing in order to control the actual value of the actual compression ratio to be the reference value of the actual compression ratio, regardless of whether or not the actual value of the actual compression ratio is the predetermined upper limit value or less, and is configured to operate the output compensating unit.

7. A control apparatus of an internal combustion engine according to claim 6, wherein the control unit controls, in a transient operation state, when the actual timing of the closing timing of the intake valve is at a side closer to a bottom dead center from the reference timing of the closing timing, the ignition timing to be the timing at the retard angle side from the reference timing of the ignition timing in case where the actual value of the actual compression ratio is not more than the predetermined upper limit value, while the ignition timing is controlled to be the timing at the retard angle side from the reference timing of the ignition timing or to be the reference timing of the ignition timing, and the actual value of the mechanical compression ratio is controlled to be a value smaller than the reference value of the mechanical compression ratio in case where the actual value of the actual compression ratio is greater than the predetermined upper limit value, in order to control the actual value of the actual compression ratio to be not more than the predetermined upper limit value.

8. A control apparatus of an internal combustion engine according to claim 6, wherein the control unit controls, in a transient operation state, when the actual value of the mechanical compression ratio is smaller than the reference value of the mechanical compression ratio, the ignition timing to be the timing at an advance angle side from the reference timing of the ignition timing in case where the actual value of the actual compression ratio is not less than the predetermined lower limit value, while the ignition timing is controlled to be the timing at the advance angle side from the reference timing of the ignition timing or to be the reference timing of the ignition timing, and the actual timing of the closing timing of the intake valve is controlled to be a timing closer to the bottom dead center from the reference timing of the closing timing in case where the actual value of the actual compression ratio is smaller than the predetermined lower limit value, in order to control the actual value of the actual compression ratio to be not less than the predetermined lower limit value.

9. A control apparatus of an internal combustion engine according to claim 6, wherein the control unit controls, in a transient operation state, when the actual timing of the closing timing of the intake valve is at a side closer to a top dead center from the reference timing of the closing timing, the actual value of the mechanical compression ratio to become a value greater than the reference value of the mechanical compression ratio in order to control the actual value of the actual compression ratio to be the reference value of the actual compression ratio, regardless of whether or not the actual value of the actual compression ratio is the predetermined lower limit value or more, and is configured to operate the output compensating unit.

10. A control apparatus of an internal combustion engine according to claim 6, wherein the control unit is configured to simultaneously control the valve closing timing adjusting mechanism and the mechanical compression ratio adjusting mechanism to allow the actual timing of the closing timing of the intake valve to agree with the reference timing of the closing timing, and to allow the actual value of the mechanical compression ratio to agree with the reference value of the mechanical compression ratio, wherein the actual value of the actual compression ratio is shifted from the reference value of the actual compression ratio due to a difference between response delays of the valve closing timing adjusting mechanism and the mechanical compression ratio adjusting mechanism.

11. A control apparatus of an internal combustion engine including a valve closing timing adjusting mechanism that adjusts a closing timing of an intake valve of the internal combustion engine, a mechanical compression ratio adjusting mechanism that adjusts a mechanical compression ratio of the internal combustion engine, and an ignition mechanism that ignites an air-fuel mixture in a combustion chamber of the internal combustion engine, the control apparatus comprising:

a reference state determining unit that, according to an operation state of the internal combustion engine, determines a reference timing of the intake valve closing timing to be within a region where the timing is retarded toward a retard angle side from an intake bottom dead center by 90° crank angle or more or to be within a region where the timing is advanced toward an advance angle side from the intake bottom dead center by 90° crank angle or more, determines a reference value of the mechanical compression ratio to be within a region of 20 or more, and determines a reference timing of the ignition timing for igniting the air-fuel mixture to be within a region around a region immediately before an intake top dead center; and a control unit that respectively controls the valve closing timing adjusting mechanism and the mechanical compression ratio adjusting mechanism to allow an actual timing of the closing timing of the intake valve to agree with the reference timing of the closing timing, and to allow an actual value of the mechanical compression ratio to agree with the reference value of the mechanical compression ratio, in order to adjust a cylinder intake air quantity that is a quantity of intake air into the combustion chamber at the closing timing of the intake valve with adjusting an actual compression ratio of the internal combustion engine, and also controls the ignition mechanism to allow the ignition timing to agree with the reference timing of the ignition timing, wherein the control unit is configured, in a transient operation state, to control the actual value of the mechanical compression ratio to be a value greater than the reference value of the mechanical compression ratio, when the actual timing of the closing timing of the intake valve is shifted to be a side closer to a top dead center from the reference timing of the closing timing.

12. A control apparatus of an internal combustion engine according to claim 11, wherein the control unit is configured to simultaneously control the valve closing timing adjusting mechanism and the mechanical compression ratio adjusting mechanism to allow the actual timing of the closing timing of the intake valve to agree with the reference timing of the closing timing, and to allow the actual value of the mechanical compression ratio to agree with the reference value of the mechanical compression ratio, wherein the actual value of the actual compression ratio is shifted from the reference value of the actual compression ratio due to a difference between response delays of the valve closing timing adjusting mechanism and the mechanical compression ratio adjusting mechanism.

13. A control apparatus of an internal combustion engine including a valve closing timing adjusting mechanism that adjusts a closing timing of an intake valve of the internal combustion engine, a mechanical compression ratio adjusting mechanism that adjusts a mechanical compression ratio of the internal combustion engine, an ignition mechanism that ignites an air-fuel mixture in a combustion chamber of the internal combustion engine, and an output compensating unit that compensates a reduction in an output of the internal combustion engine caused by a shift of the actual timing of the closing timing of the intake valve toward a side close to a top dead center, the control apparatus comprising:

a reference state determining unit that, according to an operation state of the internal combustion engine, determines a reference timing of the intake valve closing timing to be within a region where the timing is retarded toward a retard angle side from an intake bottom dead center by 90° crank angle or more or to be within a region where the timing is advanced toward an advance angle side from the intake bottom dead center by 90° crank angle or more, determines a reference value of the mechanical compression ratio to be within a region of 20 or more, and determines a reference timing of the ignition timing for igniting the air-fuel mixture to be within a region around a region immediately before an intake top dead center; and a control unit that respectively controls the valve closing timing adjusting mechanism and the mechanical compression ratio adjusting mechanism to allow an actual timing of the closing timing of the intake valve to agree with the reference timing of the closing timing, and to allow an actual value of the mechanical compression ratio to agree with the reference value of the mechanical compression ratio, in order to adjust a cylinder intake air quantity that is a quantity of intake air into the combustion chamber at the closing timing of the intake valve with adjusting an actual compression ratio of the internal combustion engine, and also controls the ignition mechanism to allow the ignition timing to agree with the reference timing of the ignition timing, wherein the control unit is configured, in a transient operation state, to control the actual timing of the closing timing of the intake valve to be a timing at a side closer to the top dead center from the reference timing of the closing timing, and to control to operate the output compensating unit, when the actual value of the mechanical compression ratio is greater than the reference value of the mechanical compression ratio.

14. A control apparatus of an internal combustion engine according to claim 12, wherein the control unit is configured to simultaneously control the valve closing timing adjusting mechanism and the mechanical compression ratio adjusting mechanism to allow the actual timing of the closing timing of the intake valve to agree with the reference timing of the closing timing, and to allow the actual value of the mechanical compression ratio to agree with the reference value of the mechanical compression ratio, wherein the actual value of the actual compression ratio is shifted from the reference value of the actual compression ratio due to a difference between response delays of the valve closing timing adjusting mechanism and the mechanical compression ratio adjusting mechanism.

\* \* \* \* \*